(12) United States Patent
Gabrielson et al.

(10) Patent No.: US 9,790,136 B2
(45) Date of Patent: *Oct. 17, 2017

(54) UREA AND NITROGEN STABILIZER COMPOSITIONS AND METHODS AND SYSTEMS OF MAKING AND USING THEREOF

(71) Applicant: Koch Agronomic Services, LLC, Wichita, KS (US)

(72) Inventors: Kurt D. Gabrielson, Lilburn, GA (US); Allen Sutton, Corydon, KY (US)

(73) Assignee: Koch Agronomic Services, LLC, Wichita, KS (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/192,536

(22) Filed: Jun. 24, 2016

(65) Prior Publication Data

US 2017/0001921 A1 Jan. 5, 2017
US 2017/0247297 A9 Aug. 31, 2017

Related U.S. Application Data

(63) Continuation of application No. 14/468,174, filed on Aug. 25, 2014, now Pat. No. 9,394,210.

(60) Provisional application No. 61/869,594, filed on Aug. 23, 2013.

(51) Int. Cl.
| | |
|---|---|
| *C05G 3/08* | (2006.01) |
| *C05C 9/00* | (2006.01) |
| *C09K 15/22* | (2006.01) |
| *C09K 15/26* | (2006.01) |
| *B01F 7/00* | (2006.01) |

(Continued)

(52) U.S. Cl.
CPC ............ *C05G 3/08* (2013.01); *B01F 7/00341* (2013.01); *C05B 7/00* (2013.01); *C05C 1/02* (2013.01); *C05C 9/00* (2013.01); *C09K 15/22* (2013.01); *C09K 15/26* (2013.01); *Y02P 60/218* (2015.11)

(58) Field of Classification Search
CPC .................. C05G 3/08; C05C 9/00
USPC ...................................... 71/28–30
See application file for complete search history.

(56) References Cited

U.S. PATENT DOCUMENTS

| | | |
|---|---|---|
| 4,530,714 A | 7/1985 | Kolc et al. |
| 4,943,308 A | 7/1990 | Vanmarcke et al. |
| 5,268,111 A | 12/1993 | Metz et al. |

(Continued)

FOREIGN PATENT DOCUMENTS

| | | |
|---|---|---|
| AU | 2013361160 A1 | 7/2015 |
| CN | 101370753 A | 2/2009 |

(Continued)

OTHER PUBLICATIONS

Fertilizers. Ullmann's Agrochemicals. vol. 1, 2007 Wiley-VCH Verlay GmbH & Co. KGaA, Weinheim. ISBN: 978-3-527-31604-5. pp. 28-29, 97-98.

(Continued)

*Primary Examiner* — Wayne Langel

(57) ABSTRACT

This invention relates to an improved urea-nitrogen stabilizer composition and methods, systems and apparatti for making thereof. The nitrogen stabilizer composition is incorporated into molten urea to result in a composition that contains less biuret, NMP, nitrogen stabilizer and/or impurities and provides an effective solid fertilizer. These compositions are useful in in odor control.

28 Claims, 10 Drawing Sheets

(51) Int. Cl.
   *C05B 7/00* (2006.01)
   *C05C 1/02* (2006.01)

(56) References Cited

U.S. PATENT DOCUMENTS

| | | | |
|---|---|---|---|
| 5,352,265 | A | 10/1994 | Weston |
| 5,364,438 | A | 11/1994 | Weston |
| 5,698,003 | A | 12/1997 | Omilinsky |
| 5,770,771 | A | 6/1998 | Sulzer |
| 6,203,730 | B1 | 3/2001 | Honda |
| 6,627,680 | B2 | 9/2003 | Zakiewicz |
| 7,682,425 | B2 | 3/2010 | Niehues |
| 7,753,985 | B2 | 7/2010 | Leopold |
| 8,048,189 | B2 | 11/2011 | Whitehurst |
| 8,075,659 | B2 | 12/2011 | Wissemeier |
| 8,080,687 | B2 | 12/2011 | Niehues |
| 8,147,784 | B2 | 4/2012 | Mueller |
| 8,419,819 | B2 | 4/2013 | Sutton |
| 8,513,460 | B2 | 8/2013 | Kysilka |
| 9,394,210 | B2 * | 7/2016 | Gabrielson .............. C05C 9/00 |
| 2007/0157689 | A1 | 7/2007 | Sutton |
| 2011/0233474 | A1 | 9/2011 | Cigler |
| 2011/0259068 | A1 | 10/2011 | Whitehurst |
| 2011/0280779 | A1 | 11/2011 | Gehrke |
| 2012/0067094 | A1 | 3/2012 | Pursell |
| 2013/0174623 | A1 | 7/2013 | Gabrielson |
| 2014/0047882 | A1 | 2/2014 | Gabrielson et al. |
| 2014/0047883 | A1 | 2/2014 | Gabrielson et al. |
| 2015/0251962 | A1 | 9/2015 | Peacock et al. |

FOREIGN PATENT DOCUMENTS

| | | |
|---|---|---|
| CN | 102503687 A | 6/2012 |
| CN | 102503707 A | 6/2012 |
| GB | 1069047 A | 5/1967 |
| WO | 97/22568 | 6/1997 |
| WO | 2008/000196 A1 | 1/2008 |
| WO | 2010/045895 | 4/2010 |
| WO | 2010/072184 | 7/2010 |
| WO | 2014/100561 A1 | 6/2014 |

OTHER PUBLICATIONS

Frame et a/. Agronomy Journal 104(5): 1201-1207 (2012).
Kincheloe, The manufacture, agronomics and marketing of AGROTAIN®. IFA Agro-Economics Committee Conference: 'Plant Nutrition in 2000', Tours, International Fertilizer Industry Association, Paris, France 1997.
Marking, Soybean Digest, Nov. 1995.
Phongpan et al., Fertilizer Research 41(1), 59-66, 1995.
Trenkel "Slow and Controlled-Release and Stabilized Fertilizers," 2010.
Varel et al., Journal of Animal Science 1999, 77(5).
Watson et al. (Soil Use and Management, Sep. 2008, 24:246-253.
Watson et al., Soil Biology & Biochemistry 26 (9), 1165-1171, 1994.
Watson, Urease inhibitors. IFA International Workshop on Enhanced-Efficiency Fertilizers, Frankfurt International Fertilizer Industry Association, Paris, France 2005.
Woodward et al. Agronomy Journal 103(1): 38-44 (2011).
Office Action for corresponding application CN 201480046780.1, issued on Dec. 28, 2016.
Extended European Search Report & European Search Opinion for corresponding application EP 14837266.7 issued on Dec. 20, 2016 (11 pages).

* cited by examiner

UREA AND NITROGEN STABILIZER COMPOSITIONS AND METHODS AND SYSTEMS OF MAKING AND USING THEREOF

CROSS-REFERENCES TO RELATED APPLICATIONS

This application is a continuation of U.S. application Ser. No. 14/468,174 filed on Aug. 24, 2014, which claims priority to U.S. Provisional Patent Application No. 61/869,594, filed Aug. 23, 2013, both of which are hereby incorporated by reference for all purposes.

FIELD OF ART

The present invention relates to an improved urea-nitrogen stablilzer composition comprising a nitrogen stabilizer, which can maintain its efficacy while containing less N-methyl pyrrolidone, UF 85, biuret, nitrogen stabilizer and/or impurities.

BACKGROUND OF THE INVENTION

Granular and prilled urea are the most widely used and agriculturally important nitrogen fertilizers. Urea as a form of nitrogen is barely taken up, or not at all, as it is rapidly hydrolyzed in the soil by the enzyme urease. Urease is ubiquitous in soil bacteria and fungi and it converts the urea back into ammonia and carbon dioxide (Mobley et al. Microbiol. Rev. 1995, 59, 452-480). During this process, gaseous ammonia may be released into the atmosphere prematurely and is then no longer available in the soil for fertilizing plants, thus reducing the efficacy of the fertilization.

One approach toward improving the availability of the nitrogen to the root system of plants over an extended period of time has involved the use of a nitrogen stabilizer such as a urease inhibitor or a nitrification inhibitor. Urease inhibitors are compounds capable of temporarily inhibiting the catalytic activity of the urease enzyme on urea in moist soil (Gardner, *Ag Retailer*, November 1995; Marking, *Soybean Digest*, November 1995, Varel et al., *Journal of Animal Science* 1999, 77(5); Trenkel "Slow and Controlled-Release and Stabilized Fertilizers, 2010). Slowing the urease-catalyzed transformation of urea to ammonium minimizes ammonia losses and allows time for absorption or dissipation of the nitrogen (N) forms into the soil. Reductions in ammonia volatilization from urease can range from 55 to over 99% (Watson et al., *Soil Biology & Biochemistry* 26 (9), 1165-1171, 1994), with a typical volatilization reduction of 75 to 80% in the field environment. One commercially used urease inhibitor is the compound NBPT, N-(n-butyl) thiophosphoric triamide, which is a pro-compound of its active oxygenated derivative, N-(n-butyl) phosphoric triamide (Phongpan et al., *Fertilizer Research* 41(1), 59-66, 1995). NBPT has been used as a coating on granular urea (see e.g. U.S. Pat. No. 5,698,003) or an additive to aqueous solutions of urea (see e.g. U.S. Pat. No. 5,364,438).

Nitrification inhibitors are compounds which inhibit the conversion of ammonium to nitrate and thus, also reduce nitrogen losses in the soil. Examples of nitrification inhibitors include, but are not limited to, dicyandiamide (DCD), 2-chloro-6-trichloromethylpyridine (nitrapyrin), 3,4-dimethylpyrazole phosphate (DMPP), 3-methylpyrazole (MP); 1-H-1,2,4-triazole (TZ); 3-methylpyrazole-1-carboxamide (CMP); 4-amino-1,2,4-triazole (AT, ATC); 3-amino-1,2,4-triazole; 2-cyanimino-4-hydroxy-6-methylpyrimidine (CP); 2-ethylpyridine; ammonium thiosulfate (ATS); sodium thiosulfate (ST); thiophosphoryl triamide; thiourea (TU); guanylthiourea (GTU); ammonium polycarboxilate; ethylene urea; hydroquinone; phenylacetylene; phenylphosphoro diamidate; neemcake; calcium carbide; 5-ethoxy-3-trichloromethyl-1,2,4-thiadiazol (etridiazol; terraole); 2-amino-4-chloro-6-methylpyrimidine (AM); 1-mercapto-1,2,4-triazole (MT); 2-mercaptobenzothiazole (MBT); 2-sulfanilamidothiazole (ST); 5-amino-1,2,4-thiadiazole; 2,4-diamino-6-trichloromethyl-s-triazine (CL-1580); N-2,5-dichlorophenyl succinanilic acid (DCS); nitroaniline, and chloroaniline.

While granular urea has been coated with NBPT and/or DCD to help prevent nitrogen loss, the disadvantages with coating granular urea is that either 1) a hygroscopic liquid carrier is used for the inhibitors, or 2) a solid carrier is used for the inhibitors which can result in residual dust which causes handling problems. These problems can be solved by incorporating the urease and/or nitrification inhibitor directly into the molten urea before it is granulated.

Solid DCD has been directly added to re-melted granular urea containing about 4 to 6 weight % water at 275° F. and subsequently passed through 1) an evaporator and 2) a granulator to form a granulated a homogeneous granular fertilizer containing about 1 weight % DCD (see U.S. Pat. No. 5,352,265). However, the high moisture content of this urea makes this product less desirable.

Similarly, a urea granule containing 0.2 weight % NBPT was produced by pumping a 56 weight % solution of 80% pure NBPT containing other impurities in N-methyl pyrrolidone (NMP) at ca. 136 lbs/hour into a stream of re-melted urea at 275° F. for about 20 seconds. The molten urea-NBPT composition was subsequently granulated to form a homogeneous granular fertilizer (see U.S. Pat. No. 5,352,265). Granular urea containing 0.01, 0.025, 0.0375, 0.05, 0.075 and 0.1 weight % NBPT has also been produced by mixing a dilute 20 weight % solution of NBPT in 10 weight % NMP and 70 weight % propylene glycol for 1 to 15 minutes (see also Watson et al. (Soil Use and Management, September 2008, 24:246-253) (see H. Cantarella, "Evaluation of the urease inhibitor NBPT N-(n-butyl)-thiophosphoric triamide on the efficiency of urea fertilizer under Brazilian Soil conditions", October 2003). However both of these compositions did not contain any nitrification inhibitor.

In addition, NBPT is costly to make and susceptible to decomposition during storage or upon heating, especially in a hygroscopic environment, like molten urea. Accordingly, there is a need to minimize the degradation of NBPT by reducing the water and impurity content in the composition, as well as the amount of NBPT used.

Further, an inherent problem with forming solid urea is that the urea is heated to or near its melting (crystalline phase change) point with a consequent increase in the biuret content. It is well known that biuret, formed by the condensation of two molecules of urea with the loss of one molecule of ammonia, is noxious to plant life since it exhibits a very active phytotoxic action. In addition, there are safety concerns because of possible exposure to ruminant animals. Biuret quickly forms ammonia at concentrations in the rumen fluid which can be toxic to the ruminant animal. While it is generally desirable that the urea have a maximum biuret content of 0.25% by weight, more preferably less, the increased times associated with mixing additional materials into molten urea results in higher biuret content.

Another problem with these prior methods is that both DCD and NBPT can be difficult materials to handle and costly. DCD has poor solubility in most solvents. Similarly, industrial grade NBPT is a waxy, sticky, heat-sensitive and water-sensitive material (see also WO 2010/045895 and U.S. Pat. No. 8,513,460). Because of the solubility issues of industrial grade NBPT and the temperatures involved in the injecting NBPT into molten urea (i.e. 275° F.), NMP has always been used as a co-solvent in the direct incorporation of NBPT into molten urea (see above, and Kincheloe, The manufacture, agronomics and marketing of AGROTAIN®. IFA Agro-Economics Committee Conference: 'Plant Nutrition in 2000', Tours, International Fertilizer Industry Association, Paris, France 1997). However, the agricultural use of NMP has environmental and regulatory constraints. While this solvent is ideal for incorporation process into molten urea because of its high boiling point and polarity, it is also difficult to remove from the final products, especially on the large scales required for efficient production of fertilizer compositions. Therefore, the ability to use less NMP is desirable.

Because most urea is produced in existing urea plants and the urea produced commercially does not contain a urease or nitrification inhibitor, the addition of NBPT or DCD has been done by re-melting granular urea. Accordingly, systems and apparati to perform these types of operations are not commercially available in urea production facilities and must be adaptable to existing urea manufacturing plants.

Accordingly, there is a need for improved compositions where a nitrogen stabilizer is combined with molten urea that uses substantially less NMP and/or nitrogen stabilizer, and contains less water, biuret and other impurities, but that still provides effective fertilizer granules. Further, there is a need for improved compositions that use less nitrogen stabilizer by minimizing degradation and other side-products formed during the process to make the composition. There is also a need for improved methods, apparati and systems for making and using the same. The above mentioned disadvantages can be solved by compositions, methods, apparati and systems according to the present invention.

BRIEF SUMMARY OF THE INVENTION

In one aspect, the present invention provides a urea-nitrogen stabilizer composition, comprising:
a) urea; and
b) a nitrogen stabilizer composition, comprising a urease inhibitor, a nitrification inhibitor or combinations thereof. In other aspects, the present invention provides a method of making a urea-nitrogen stabilizer composition prepared as described herein.

In other aspects, the present invention relates to a composition wherein the urea is molten urea and the nitrogen stabilizer composition is mixed into the molten urea. In other aspects, the nitrogen stabilizer composition comprises a carrier. Alternative, the nitrogen stabilizer may be added without a carrier. For example, the nitrogen stabilizer may be incorporated directly into molten urea by blending solid nitrogen stabilizer without a carrier, a nitrogen stabilizer dispersed on or with a solid carrier, or a solution of a nitrogen stabilizer that contains a liquid carrier. If NMP is used in a liquid carrier, it is used in a reduced amount.

In other aspects, the invention provides compositions with other components, including, but not limited to a conditioning agent, an anti-caking agent, a crystallization inhibitor, an antioxidant, a pH control agent, a crop protection agent, a plant growth regulator, a micronutrient, an anticorrosion agent, a dye or combinations thereof.

In another embodiment, the method involves a system and/or an apparatus as disclosed herein. These and other objects, aspects, and embodiments will become more apparent when read with the following detailed description.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure.

FIG. 7A: Wheeling silt loam (Montgomery Co., VA pH 6.6); FIG. 7B: Pella silt loam (Fond du Lac Co., WI pH 7.7); FIG. 7C: Raub silt loam (McLean Co., IL pH 6.3). The volativity curves indicate the difference in N loss between compositions containing an incorporated nitrification inhibitor when compared with no nitrification inhibitor in different soils.

DETAILED DESCRIPTION OF THE INVENTION

Figure 1:
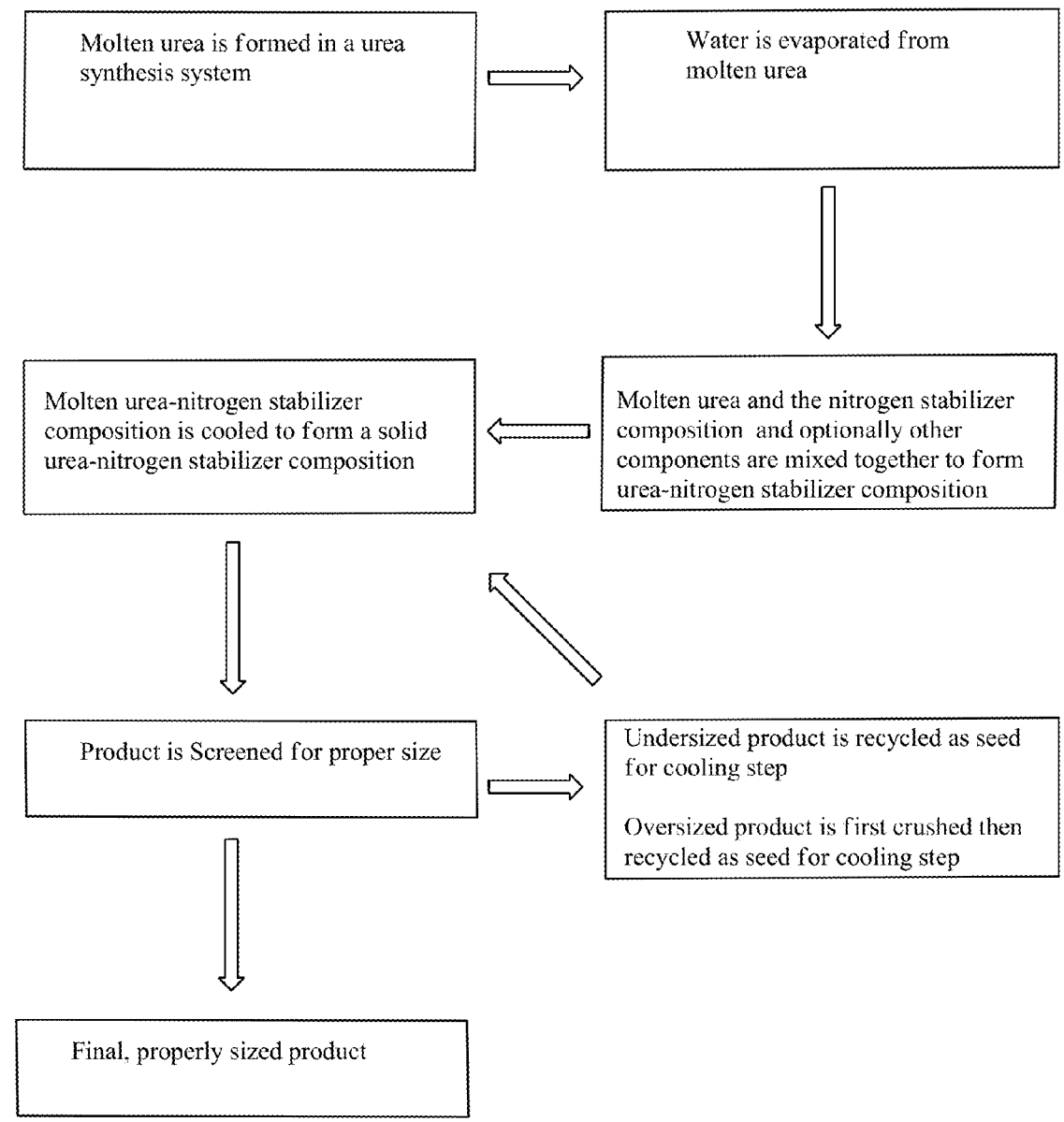
FIG. 1: Illustrates a flow diagram of the overall mixing system starting with introduction of molten urea and other components as they are fed into a mix tank before the intermediate product is conveyed to a cooling apparatus.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

Definitions

The terms "a," "an," or "the" as used herein not only includes aspects with one member, but also aspects with more than one member. For example, an embodiment including "a urease inhibitor and a nitrification inhibitor" should be understood to present aspects with at least a second urease inhibitor, at least a second nitrification inhibitor, or both. In this specification and in the claims that follow, reference will be made to a number of terms that shall be defined to have the following meanings unless a contrary intention is apparent.

The term "about" as used herein to modify a numerical value indicates a defined range around that value. If "X" were a specified value, "about X" would generally indicate a range of values from 0.95× to 1.05×. Any reference to "about X" specifically denotes at least the values X, 0.95×, 0.96×, 0.97×, 0.98×, 0.99×, 1.01×, 1.02×, 1.03×, 1.04×, and 1.05×. Thus, "about X" is intended to teach and provide written description support for a claim limitation of, e.g., "0.98×." When the quantity "X" only includes whole-integer values (e.g., "X carbons"), "about X" indicates a range from (X−1) to (X+1). In this case, "about X" as used herein specifically indicates at least the values X, X−1, and X+1. When "about" is applied to the beginning of a numerical range, it applies to both ends of the range. Thus, "from about 0.2 to 2.0%" is equivalent to "from about 0.2% to about 2.0%." When "about" is applied to the first value of a set of values, it applies to all values in that set. Thus, "about 2, 4, or 7%" is equivalent to "about 2%, about 4%, or about 7%."

In formulations comprising an "additional," "further," or "second" component, the second component as used herein is chemically different from the other components or first component. A "third" component is different from the other, first, and second components, and further enumerated or "additional" components are similarly different.

"Alkyl," by itself or as part of another substituent, means, unless otherwise stated, a straight or branched chain, fully saturated aliphatic hydrocarbon radical having the number of carbon atoms designated. For example, "$C_{1-8}$alkyl" refers to a hydrocarbon radical straight or branched, containing from 1 to 8 carbon atoms that is derived by the removal of one hydrogen atom from a single carbon atom of a parent alkane. The phrase "unsubstituted alkyl" refers to alkyl groups that do not contain groups other than fully saturated aliphatic hydrocarbon radicals. Thus the phrase includes straight chain alkyl groups such as methyl, ethyl, propyl, butyl, pentyl, hexyl, heptyl, octyl, nonyl, decyl, undecyl, dodecyl and the like. The phrase also includes branched chain isomers of straight chain alkyl groups such as isopropyl, t-butyl, isobutyl, sec-butyl, and the like. Representative alkyl groups include straight and branched chain alkyl groups having 1, 2, 3, 4, 5, 6, 7, 8, 9, 10, 11 or 12 carbon atoms. Further representative alkyl groups include straight and branched chain alkyl groups having 1, 2, 3, 4, 5, 6, 7 or 8 carbon atoms.

"Alkylene" by itself or as part of another substituent means a divalent radical derived from an alkane, as exemplified by —$CH_2CH_2CH_2CH_2$—. Typically, an alkylene group will have from 1, 2, 3, 4, 5, 6, 7 or 8 carbon atoms that is derived by the removal of one hydrogen atom from a single carbon atom of a parent alkyl.

"Amide solvents" include the amides set forth as solvents for NMP in U.S. Pat. No. 5,352,265. Typically, amide solvents have boiling points above about 150° C. and in many cases above about 200° C. i.e., well above the temperature of molten urea. Examples of amide solvents include formamide, N,N-dimethyl formamide, N,N-dimethyl acetamide, and N-butyl N-phenyl acetamide. The N-alkyl 2-pyrrolidones used as amide solvents solvents include five-membered heterocyclic organic compounds with one nitrogen atom per ring, with an oxygen atom bonded to a ring carbon atom adjacent to the nitrogen, and with an alkyl group ranging in size from one to twelve carbon atoms bonded directly to the nitrogen atom. Examples of N-alkyl 2-pyrrolidone amide solvents include N-methyl 2-pyrrolidone (i.e., NMP), N-octyl 2-pyrrolidone, and N-dodecyl 2-pyrrolidone.

The term "or" as used herein should in general be construed non-exclusively. For example, an embodiment of "a composition comprising A or B" would typically present an aspect with a composition comprising both A and B. "Or" should, however, be construed to exclude those aspects presented that cannot be combined without contradiction (e.g., a composition that is about 5% by weight or about 10% by weight).

Generally, when a percentage range is taught, it is intended to describe all full or partial percentages in between (i.e., within the bounds of the range). For example, a percentage range of 15 to 25% would also teach inter alia the specific values of 17.36% and 21%. A percentage range of about 13 to 17% would also teach inter alia the specific values of 12.97%, 16%, and 17.1%.

"Substantially free of X" as used herein means that either no X can be detected in the mixture; or, if X can be detected, it is (1) present in <1% w/w (preferably, <0.1% w/w); and (2) does not produce effects characteristic of X at higher proportions. For example, a composition substantially free of a NMP would not produce the environmental effects of exposure to concentrated or pure NMP even if a trace amount of NMP could be detected in the mixture.

The term "w/w," "wt/wt," or "by weight" means a percentage calculated by taking the fraction that is the weight of the specified component over the total weight of the composition and multiplying by 100.

Although any methods and materials similar or equivalent to those described herein can also be used in the practice or testing of the present disclosure, particular compositions, methods, systems and apparatti are now described.

Urea-Nitrogen Stabilizer Compositions

In one group of embodiments, the present invention provides a urea-nitrogen stabilizer composition comprising:

a) urea; and
b) a nitrogen stabilizer composition, selected from the group consisting of a urease inhibitor, a nitrifiction inhibitor, and combinations thereof.

Urea

The urea-based fertilizer composition of the present invention can include any suitable urea source. In one group of embodiments, the urea source is urea which has been synthesized and still molten (not cooled and re-melted). In one group of embodiments, the urea source is a solid form of urea, including but not limited to granulated or prilled urea, that is re-melted and dehydrated. In another group of embodiments, the urea is produced from ammonia and carbon dioxide for example in an industrial urea production plant. One of skill in the art will appreciate other urea sources for the inventive methods.

The amount of the urea in the urea-based granular fertilizer can range from about 1% to about 99% by weight of the total weight of the urea-nitrogen stabilizer composition. The amount of the urea in the urea-nitrogen stabilizer composition can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or about 99% by weight of the total weight of the urea-nitrogen stabilizer composition. In one group of embodiments the amount of urea is at least about 60 wt. %, about 70 wt. % about 80 wt. % about 90 wt. %, about 91 wt. %, about 92 wt. %, about 93 wt. %, about 94 wt. %, about 95 wt. %, about 96 wt. %, about 97 wt. %, about 98 wt. %, or about about 99 wt. %.

In some aspects of the present invention, the molten urea may initially contain up to about 70 wt. %, about 75 wt. %, about 80 wt. %, about 85 wt. %, about 80 wt. % urea in water, either from the source of the urea used or from the addition of UF85 and the like. Such a molten urea solution can be concentrated further by vacuum concentration, or evaporation at atmospheric pressure. Preferably, however, the concentration of water is reduced to 9%, 8%, 7%, 6%, 5.5%, 5%, 4.5%, 4%, 3.5%, 3%, 2.5%, 2%, 1.5%, 1%, or less than 1% (e.g., about 0.5, 0.4, 0.3, 0.2, or 0.1%).

In one embodiment, the present invention provides an urea-nitrogen stabilizer composition wherein the concentration of water is at most about 1 weight percent based on the total weight of the urea-urease inhibitor composition.

In one group of embodiments, the urea-nitrogen stabilizer composition contains less than about 1.8 weight percent biuret based on the total weight of the urea-nitrogen stabilizer composition. In other embodiments, the amount of biuret is less than about 1.8, about 1.7, about 1.6, about 1.5, about 1.4, about 1.3, about 1.2, about 1.1, about 1.0, about 0.9, about 0.8, about 0.7, about 0.6, about 0.5, about 0.4, about 0.3, about 0.2 or about 0.1 weight percent of the total composition.

Nitrogen Stabilizer Compositions

As noted above, the present invention relates to nitrogen stabilizer compositions, which may include urease inhibitors, nitrification inhibitors, or combinations thereof. The compositions may further comprise a solid or liquid carrier or the urease inhibitor and/or nitrification inhibitor can be used without a carrier. It should be borne in mind that, in practice urease and nitrification inhibitors do not completely inhibit, but instead suppress over an extended period of time the susceptibility of urea compositions to catalytic hydrolysis by enzymes and the propensity of any ammonia that does form to promote excessive bacterial growth.

Urease Inhibitors

"Urease inhibitor" as used herein refers to a compound that reduces, inhibits, or otherwise slows down the conversion of urea to ammonium ($NH_4^+$) in soil when the compound is present as opposed to the conversion of urea to ammonium ($NH_4^+$) in soil when the compound is not present, but conditions are otherwise similar. Nonlimiting examples of urease inhibitors include thiophosphoric triamide compounds disclosed in U.S. Pat. No. 4,530,714. In other embodiments, the urease inhibitor is a phosphorous triamide having the formula:

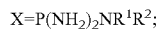

$X=P(NH_2)_2NR^1R^2$;

wherein X is oxygen or sulfur; and $R^1$ and $R^2$ are each a member independently selected from the group consisting of hydrogen, $C_1$-$C_{12}$ alkyl, $C_3$-$C_{12}$ cycloalkyl, $C_6$-$C_{14}$ aryl, $C_2$-$C_{12}$ alkenyl, $C_2$-$C_{12}$ alkynyl, $C_5$-$C_{14}$ heteroaryl, $C_1$-$C_{14}$ heteroalkyl, $C_2$-$C_{14}$ heteroalkenyl, $C_2$-$C_{14}$ heteroalkynyl, or $C_3$-$C_{12}$ cycloheteroalkyl. Illustrative urease inhibitors can include, but are not limited to, N-(n-butyl)thiophosphoric triamide (NBPT), N-(n-butyl)phosphoric triamide, thiophosphoryl triamide, phenyl phosphorodiamidate, cyclohexyl phosphoric triamide, cyclohexyl thiophosphoric triamide, phosphoric triamide, hydroquinone, p-benzoquinone, hexamidocyclotriphosphazene, thiopyridines, thiopyrimidines, thiopyridine-N-oxides, N,N-dihalo-2-imidazolidinone, N-halo-2-oxazolidinone, derivatives thereof, or any combination thereof. Other examples of urease inhibitors include phenylphosphorodiamidate (PPD/PPDA), hydroquinone, N-(2-nitrophenyl) phosphoric acid triamide (2-NPT), ammonium thiosulphate (ATS) and organo-phosphorous analogs of urea are effective inhibitors of urease activity (see e.g. Kiss and Simihaian, Improving Efficiency of Urea Fertilizers by Inhibition of Soil Urease Activity. Kluwer Academic Publishers, Dordrecht, The Netherlands, 2002; Watson, Urease inhibitors. IFA International Workshop on Enhanced-Efficiency Fertilizers, Frankfurt. International Fertilizer Industry Association, Paris, France 2005). In at least one embodiment, the urease inhibitor composition is or includes N-(n-butyl)thiophosphoric triamide (NBPT).

The preparation of phosphoramide urease inhibitors such as NBPT can be accomplished by known methods starting from thiophosphoryl chloride, primary or secondary amines and ammonia, as described, for example, in U.S. Pat. No. 5,770,771. In a first step, thiophosphoryl chloride is reacted with one equivalent of a primary or secondary amine in the presence of a base, and the product is subsequently reacted with an excess of ammonia to give the end product. Other methods include those described in U.S. Pat. No. 8,075,659, where thiophosphoryl chloride is reacted with a primary and/or secondary amine and subsequently with ammonia. However this method can result in mixtures. Accordingly, when N-(n-butyl)thiophosphoric triamide (NBPT) or other urease inhibitors are used, it should be understood that this refers not only to the urease inhibitor in its pure form, but also to industrial grades of the material that may contain up to about 50% wt. %, about 40% about 30%, about 20% about 19 wt. %, about 18 wt. %, about 17 wt. %, about 16 wt. %, about 15 wt. %, about 14 wt. %, about 13 wt. %, about 12 wt. %, about 11 wt. %, 10 wt. %, about 9 wt. %, about 8 wt. %, about 7 wt. %, about 6 wt. % about 5 wt. %, about 4 wt. %, about 3 wt. % about 2 wt. % about 1 wt. % impurities, depending on the method of synthesis and purification scheme(s), if any, employed in the production of the urease inhibitor. A typical impurity is PO(NH$_2$)$_3$ which can catalyze the decomposition of NBPT under aqueous conditions. Thus in some embodiments, the urease inhibitor used is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 99.1%, about 99.2%, about 99.3%, about 99.4%, about 99.5%, about 99.6%, about 99.7%, about 99.8%, about 99.9% pure.

In one group of embodiments, the amount of the urease inhibitor in the urea-nitrogen stabilizer composition is about 0.001 wt. %, 0.002 wt. %, 0.003 wt. %, 0.004 wt. %, 0.005 wt. %, 0.006 wt. %, 0.007 wt. %, 0.008 wt. %, 0.009 wt. %, about 0.01 wt. %, about 0.02 wt. %, about 0.0205 wt. %, about 0.021 wt. %, about 0.0215 wt. %, about 0.022 wt. %, about 0.0225 wt. %, about 0.023 wt. %, about 0.0235 wt. %, about 0.024 wt. %, about 0.0245 wt. %, about 0.025 wt. %, about 0.0255 wt. %, about 0.026 wt. %, about 0.0265 wt. %, about 0.027 wt. %, about 0.0275 wt. %, about 0.028 wt. %, about 0.0285 wt. %, about 0.029 wt. %, about 0.0295 wt. %, about 0.03 wt. %, about 0.04 wt. %, about 0.05 wt. %, about 0.06 wt. %, about 0.07 wt. %, 0.075 wt. %, about 0.08 wt. %, about 0.085 wt. %, about 0.09 wt. %, about 0.095 wt. %, about 0.10 wt. %, about 0.11 wt. %, about 0.12 wt. %, about 0.13 wt. %, about 0.14 wt. %, about 0.15 wt. %, about 0.16 wt. %, about 0.17 wt. %, about 0.18 wt. %, about 0.19 wt. %, or about 0.2 wt. %, based on the total weight of the urea-nitrogen stabilizer composition.

Nitrification Inhibitors

In some aspects, the molten urea-nitrogen stabilizer composition further comprises a nitrification inhibitor or ammonia stabilizer. "Nitrification inhibitor" as used herein refers to a compound that reduces, inhibits, or otherwise slows down the conversion of ammonium (NH$_4^+$) to nitrate in soil when the compound is present as compared to the conversion of ammonium (NH$_4^+$) to nitrate in soil when the compound is not present, but conditions are otherwise similar. Illustrative nitrification inhibitors can include, but are not limited to dicyandiamide (DCD), 2-chloro-6-trichloromethylpyridine (nitrapyrin), 3,4-dimethylpyrazole phosphate (DMPP), 3-methylpyrazole (MP); 1-H-1,2,4-triazole (TZ); 3-methylpyrazole-1-carboxamide (CMP); 4-amino-1,2,4-triazole (AT, ATC); 3-amino-1,2,4-triazole; 2-cyanimino-4-hydroxy-6-methylpyrimidine (CP); 2-ethylpyridine; ammonium thiosulfate (ATS); sodium thiosulfate (ST); thiophosphoryl triamide; thiourea (TU); guanylthiourea (GTU); ammonium polycarboxilate; ethylene urea; hydroquinone; phenylacetylene; phenylphosphoro diamidate; azadirachta indica Juss (Neem, neemcake); calcium carbide; 5-ethoxy-3-trichloromethyl-1,2,4-thiadiazol (etridiazol; terraole); 2-amino-4-chloro-6-methylpyrimidine (AM); 1-mercapto-1,2,4-triazole (MT); 2-mercaptobenzothiazole (MBT); 2-sulfanilamidothiazole (ST); 5-amino-1,2,4-thiadiazole; 2,4-diamino-6-trichloromethyl-s-triazine (CL-1580); N-2,5-dichlorophenyl succinanilic acid (DCS); nitroaniline, chloroaniline, 2-amino-4-chloro-6-methyl-pyrimidine, 1,3-benzothiazole-2-thiol, 4-amino-N-1,3-thiazol-2-ylbenzenesulfonamide, guanidine, polyetherionophores, 3-mercapto-1,2,4-triazole, potassium azide, carbon bisulfide, sodium trithiocarbonate, ammonium dithiocarbamate, 2,3-dihydro-2,2-dimethyl-7-benzofuranol methyl-carbamate, N-(2,6-dimethylphenyl)-N-(methoxyacetyl)-alanine methyl ester, ammonium thiosulfate, 1-hydroxypyrazole, 2-methylpyrazole-1-carboxamide, 2-amino-4-chloro-6-methyl-pyramidine, 2,4-diamino-6-trichloro-methyltriazine; and derivatives thereof, and any combination thereof.

For example, 1-hydroxypyrazole can be considered a derivative of 2-methylpyrazole-1-carboxamide and ammonium dithiocarbamate can be considered a derivative of methyl-carbamate. In at least one example, the nitrification inhibitor can be or include dicyandiamide (DCD). In at least one example, the nitrification inhibitor can be or include 3,4-dimethylpyrazole phosphate (DMPP). In at least one example, the nitrification inhibitor can be or include nitropyrin.

In one group of embodiments, the nitrification inhibitor may contain about 50% wt. %, about 40% about 30%, about 20% about 19 wt. %, about 18 wt. %, about 17 wt. %, about 16 wt. %, about 15 wt. %, about 14 wt. %, about 13 wt. %, about 12 wt. %, about 11 wt. %, 10 wt. %, about 9 wt. %, about 8 wt. %, about 7 wt. %, about 6 wt. % about 5 wt. %, about 4 wt. %, about 3 wt. % about 2 wt. % about 1 wt. % impurities, depending on the method of synthesis and purification scheme(s), if any, employed in the production of the nitrification inhibitor.

In one group of embodiments, the amount of the nitrification inhibitor in the urea-nitrogen stabilizer composition is about 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, about 0.1 wt. %, about 0.2 wt. %, about 0.3 wt. %, about 0.4 wt. %, about 0.5 wt. %, about 0.6 wt. %, about 0.7 wt. %, 0.75 wt. %, about 0.8 wt. %, about 0.85 wt. %, about 0.9 wt. %, about 0.95 wt. %, about 1 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, or about 2 wt. %, based on the total weight of the urea-nitrogen stabilizer composition. In some aspects, the molten urea-nitrogen stabilizer composition comprises a nitrification inhibitor in an amount between about 0.1% and about 2.2% by weight. In some aspects, the molten urea-nitrogen stabilizer composition comprises a nitrification inhibitor in an amount between about 0.2% and about 1.2% by weight. In some aspects, the molten urea-nitrogen stabilizer composition comprises a nitrification inhibitor in an amount between about 0.75 wt. % and about 0.95 wt. %. In one embodiment, the present invention provides an urea-nitrogen stabilizer composition, wherein urea is present in the amount between about 90 wt. % to about 99 wt. %.

In some embodiments, the use of two specific additives, one to inhibit the urease-catalyzed hydrolysis of urea and the other to inhibit the nitrification of ammonia, in the fertilizer composition of this invention offers an opportunity to tailor the make-up of the composition to match the nitrogen nutrient demand of a given crop/soil/weather scenario. For example, if conditions are such that the opportunity for ammonia losses through volatilization to the atmosphere is thereby diminished, the level of the NBPT nitrogen stabilizer incorporated into the formulation may be reduced, within the specified range, without also changing the level of the nitrification inhibitor. The relative resistance of the granular fertilizer composition of this invention to urea hydrolysis and ammonia oxidation is controlled by properly selecting the urease inhibitor to nitrification weight ratio of the composition. This ratio can be from about 0.02 and to about 10.0, or about 0.04 and to about 4.0. For compositions with urease inhibitor to nitrification inhibitor weight ratios near the higher end of these ranges will exhibit relatively higher resistance to urea hydrolysis than to ammonium oxidation, and vice versa.

In some embodiments, the urea-nitrogen stabilizer composition comprises (i) urea in an amount between about 90% and about 99% by weight; (ii) a urease inhibitor in an amount between about 0.02% and about 0.4% by weight;

and (iii) a nitrification inhibitor in an amount between about 0.05% and about 3.0% by weight.

If both a urease inhibitor and a nitrification inhibitor are used, the urease inhibitor may be added previous to, simultaneously with or subsequent to the nitrification inhibitor. In some embodiments, the urease inhibitor and the nitrification inhibitor are mixed together before being added to the molten urea.

Carriers

In one group of embodiments, the present invention provides a nitrogen stabilizer composition with no carrier. In another group of embodiments, the present invention provides a nitrogen stabilizer composition with a liquid carrier. In another group of embodiments, the present invention provides an nitrogen stabilizer composition with a solid carrier. Thus in one group of embodiments, the present invention provides an urea-nitrogen stabilizer composition comprising: a) urea; and b) nitrogen stabilizer composition; wherein the nitrogen stabilizer composition is substantially free from a solid or liquid carrier. In other embodiments, the nitrogen stabilizer is incorporated into the molten urea with a solid carrier or liquid carrier.

Liquid Carriers

Any suitable liquid carrier capable of at least partially solubilizing the nitrogen stabilizer can be used. In one group of embodiments, the liquid carrier has a boiling point higher than the melting (crystalline phase change) temperature of urea e.g. about 275° F. at atmospheric pressure. In one group of embodiments, the liquid carriers has a boiling point of at least 125° C. at atmospheric pressure. In another group of embodiments, the liquid carrier has a flash point higher than the melting temperature of urea. Non-limiting examples of liquid carriers include, but are not limited to an alcohol, a diester of a dicarboxylic acid, an alkyl carbonate, a cyclic carbonate ester; and mixtures thereof. Non-limiting examples of an alcohol include an alkanol, an alkenol, a hydroxyalkyl aryl compound, a glycol, a glycol ether, a glycol ester, a poly(alkylene glycol), a poly(alkylene glycol) ether, an poly(alkylene glycol) ester, an ester of a hydroxyacid, and a hydroxylalkyl heterocycle.

In some aspects, the carrier is a liquid carrier. In some aspects, the liquid carrier has a boiling point of at least 125° C. under atmospheric pressure. In some aspects, the liquid carrier comprises at least one member selected from the group consisting of an alcohol (including heterocyclic alcohols), an alkanolamine, a hydroxy acid, a diester of a dicarboxylic acid, an ester amide of a dicarboxylic acid, an alkyl carbonate, a cyclic carbonate ester and a glycol ether.

In some aspects, the liquid carrier is an alcohol. In some aspects, the alcohol is selected from the group consisting of an alkanol, an alkenol, a hydroxyalkyl aryl compound, a glycol, a glycol ether, a glycol ester, a poly(alkylene glycol), a poly(alkylene glycol) ether, an poly(alkylene glycol) ester, an ester of a hydroxyacid, and a hydroxylalkyl heterocycle. In some aspects, the carrier comprises a hydroxyalkyl aryl compound as set forth in, e.g., U.S. patent application Ser. No. 13/968,318.

In some aspects the liquid carrier is a glycol. In some aspects, the glycol is a $C_1$-$C_6$ aliphatic glycol. Examples include ethylene glycol; propylene glycol; 1,4-butanediol; 1,2-pentanediol; 1,3-hexanediol; and the like. In a particular aspect, the carrier comprises ethylene or propylene glycol. Additional glycols are set forth in, e.g., U.S. Pat. Nos. 5,698,003 and 8,075,659.

In some aspects, the liquid carrier is an alkanolamine. Examples include but are not limited to ethanolamine, diethanolamine, triethanolamine, monoisopropanolamine, diisopropanolamine, 2-aminoethanol; 2- or 3-aminopropanol; 1-amino-2-propanol; 2- or 3-aminobutanol; 2-, 3-, or 4-aminopentanol; 2-, 3-, or 4-amino-2-methylbutanol; 3-aminopropylene glycol; and the like. Additional amino alcohols are set forth in, e.g., U.S. Pat. Publ. No. 2010/0206031, 2011/0113842, 2011/0259068, and U.S. Pat. No. 8,048,189.

In some aspects, the liquid carrier is a glycol ether. In some aspects, the ether's alkyl group is a $C_1$-$C_6$ aliphatic alkyl group, such as methyl, ethyl, butyl, isopropyl, or tert-butyl. In some aspect, the glycol ether comprises a $C_1$-$C_6$ aliphatic glycol as discussed herein, such as an glycol ether of ethylene glycol; propylene glycol; 1,4-butanediol; 1,2-pentanediol; 1,3-hexanediol; and the like. In a particular aspect, the glycol ether is an ether of ethylene or propylene glycol. Additional glycol ethers are set forth in, e.g., Int'l. Pat. Publ. No. WO 2008/000196 and U.S. patent application Ser. No. 13/968,324.

In some embodiments, the liquid carrier is 1,2-isopropylideneglycerol or glycerol acetonide):

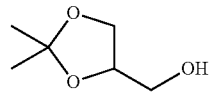

as disclosed in U.S. Patent Publication No. 2013/0145806.

In some aspects, the liquid carrier is a poly(alkylene glycol). The poly(alkylene glycol) can include glycol monomers of only one type, such as poly(ethylene glycol) or poly(propylene glycol), or may include more than one type, such as a copolymer of ethylene glycol and propylene glycol. The alkylene glycol monomer can be any of the types disclosed herein or in the publications incorporated by reference. In some aspects, the polymer is an oligomer comprising 2 to 16, 2 to 10, 2 to 6, 2 to 5, or 2 to 4 monomers, e.g., methyl or butyl ethers of di(ethylene glycol) or tri(ethylene glycol); a methyl ether of di(propylene glycol). In certain aspects, the poly(alkylene glycol) may be a solid, either at room temperature or under the conditions of addition. Additional poly(alkylene glycol)s are set forth in, e.g., Int'l. Pat. Publ. No. WO 2008/000196 and U.S. patent application Ser. No. 13/968,324.

In some aspects, the liquid carrier is a poly(alkylene glycol) ether. In some aspects, the ether's alkyl group is a $C_1$-$C_6$ aliphatic alkyl group, such as methyl, ethyl, butyl, isopropyl, or tert-butyl. In some aspects the glycol ether is dipropyleneglycol, monomethylether, diethyleneglycol monomethylether, triethyleneglycol monomethylether or diethyleneglycol monobutylether. In certain aspects, the poly(alkylene glycol) ether may be a solid, either at room temperature or under the conditions of addition. Additional glycol ethers are set forth in, e.g., Int'l. Pat. Publ. No. WO 2008/000196 and U.S. patent application Ser. No. 13/968, 324.

In some aspects, the liquid carrier is comprises a poly (alkylene glycol) ester. In some aspects, the ester's alkyl group is a $C_1$-$C_6$ aliphatic alkyl group, such as methyl, ethyl, butyl, isopropyl, or tert-butyl. The poly(alkylene glycol) component of the ester can be any of the types disclosed or referenced herein. In certain aspects, the poly(alkylene glycol) ester may be a solid, either at room temperature or under the conditions of addition.

In some aspects, the liquid carrier is comprises an ester of a hydroxyacid. In some aspects, the ester's alkyl group is a $C_1$-$C_6$ aliphatic alkyl group, such as methyl, ethyl, butyl, isopropyl, or tert-butyl. In some other aspects, the hydroxyacid is a $C_2$-$C_6$ aliphatic hydroxyacid, such as hydroxyacetic or lactic acid. Additional esters of hydroxyacids are set forth in, e.g., U.S. Pat. Publ. No. 2010/0206031.

In some aspects, the liquid carrier is comprises a hydroxylalkyl heterocycle. Examples include a cyclic methylene or ethylene ether formed from ethylene glycol, propylene glycol, or any other 1,2-, 1,3-, or 1,4-diol-containing glycol as described or referenced in the aspects herein. Other examples include 5-, 6-, and 7-membered cyclic ethers with a hydroxymethyl or hydroxyethyl substituent, such as (tetrahydro-2H-pyran-4-yl)methanol. Additional hydroxyalkyl heterocycles are set forth in, e.g., U.S. Pat. Publ. No. 2010/0206031.

In some aspects, the liquid carrier is a diester of a dicarboxylic acid. In some aspects, the diester's alkyl groups, which can be the same or different, are $C_1$-$C_6$ aliphatic alkyl groups, such as methyl, ethyl, butyl, isopropyl, or tert-butyl. The carboxylic acid groups may be substituents of a $C_1$-$C_6$ aliphatic or alkylenic group, such as for malonic, 2-methylmalonic, succinic, maleic, or tartaric acid. Additional diesters of dicarboxylic acids are set forth in, e.g., U.S. Pat. Publ. No. 2001/0233474 and WO 2010/072184.

In some aspects, the liquid carrier is a mixed ester amide of a dicarboxylic acid. In some aspects, the ester's alkyl groups are those recited above. In some aspects, the amide group are unsubstituted or substituted amines. The substituents on the amino group, which can be the same or different, are $C_1$-$C_6$ aliphatic alkyl groups, such as methyl, ethyl, butyl, isopropyl, or tert-butyl. Examples of mixed ester amides of dicarboxylic acids include methyl 5-(dimethylamino)-2-methyl-5-oxopentanoate (Chemical Abstracts No. 1174627-68-9):

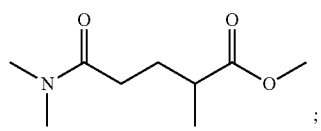

as set forth in, e.g., U.S. Patent Publication No. 2011/0166025.

In some aspects, the liquid carrier is an alkyl carbonate. In some aspects, the carbonate's alkyl groups are $C_1$-$C_6$ aliphatic alkyl groups, such as methyl, ethyl, butyl, isopropyl, or tert-butyl. The two alkyl groups can be the same or different (e.g., methyl ethyl carbonate). In some aspects, the alkyl carbonate is a lactate, such as (S)-ethyl lactate or propylene carbonate such as those disclosed in U.S. Patent Publication No. 2011/0233474).

In some aspects, the liquid carrier is a cyclic carbonate ester. Examples include a cyclic carbonate formed from ethylene glycol, propylene glycol, or any other 1,2-, 1,3-, or 1,4-diol-containing glycol as described or referenced in the aspects herein. Additional cyclic carbonate esters are set forth in, e.g., U.S. Pat. Publ. No. 2001/0233474. Other examples of suitable liquid formulations of (thio)phosphoric triamides can be found in WO 97/22568, which is referred to in its entirety.

In some aspects, the liquid carrier an aprotic solvent, such as a sulfone, for example dimethylsulfoxide (DMSO).

In other embodiments, liquid carrier used with the nitrogen stabilizer composition is NMP. In some embodiments, the nitrogen stabilizer composition includes a carrier other than N-methyl 2-pyrrolidinone (NMP). In other embodiments, liquid carrier used with the nitrogen stabilizer composition includes NMP.

In one group of embodiments, the amount of liquid carrier used is the minimum amount to solubilize the amount of nitrogen stabilizer used. For example, if the nitrogen stabilizer is a urease inhibitor, the concentration of the urease inhibitor may be greater than about 56 wt. % based on the total weight of the composition. In another embodiment, the concentration of the urease inhibitor may be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55% by weight of the total weight of the nitrogen stabilizer composition.

If the nitrogen stabilizer is a nitrification inhibitor, the concentration of the nitrification inhibitor may be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55% by weight of the total weight of the urea-nitrogen stabilizer composition can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or about 99% by weight of the total weight of the nitrogen stabilizer composition In one embodiment, if the liquid carrier comprises NMP, the NMP is in a concentration of about 10 weight percent to about 30 weight percent and propylene glycol in a concentration of about 40 weigh percent to about 70 weight percent based on the total weight of the inhibitor composition. In another embodiment, the concentration of the urease inhibitor in the urea-nitrogen stabilizer composition is greater than 0.1 weight percent and the amount of NMP is less than 0.1 weight percent based on the total weight of the urea-nitrogen stabilizer composition.

Solid Carriers

In some aspects, the carrier is a solid carrier. The solid carrier can take one of several solid forms, including but not limited to particles, powders, granules, compacts, and the like and combinations thereof. The density, (including true density, absolute density, apparent density, relative density and bulk density); solid fraction, porosity and specific volume of these materials may vary depending on the desired flow characteristics in combination with the nitrogen stabilizer. Non-limiting examples of solid carriers include diatomaceous earth, ionic salts, (including but not limited to inorganic salts or organic salts, including but not limited to ammonium salts); a urea-formaldehyde polymer (UFP), solid urea, a grain flour, a clay, or elemental sulfur.

In one embodiment, the present invention provides an urea-nitrogen stabilizer composition, wherein the urease inhibitor, if present, has a purity of greater than 80%, or greater than 81%, or greater than 82%, or greater than 83%, or greater than 84%, or greater than 85%, or greater than 86%, or greater than 87%, or greater than 88%, or greater than 89%, or greater than 90%, or greater than 91%, or greater than 92%, or greater than 93%, or greater than 94%, or greater than 95%, or greater than 96%, or greater than 97%, or greater than 98%, or greater than 99%.

In one embodiment, the present invention provides an urea-nitrogen stabilizer composition, wherein the urease inhibitor, if present, has a purity of greater than 95.1%, or greater than 95.2%, or greater than 95.3%, or greater than 95.4%, or greater than 95.5%, or greater than 95.6%, or greater than 95.7%, or greater than 95.8%, or greater than 95.9%, or greater than 96.1%, or greater than 96.2%, or greater than 96.3%, or greater than 96.4%, or greater than 96.5%, or greater than 96.6%, or greater than 96.7%, or greater than 96.8%, or greater than 96.9%, or greater than 97.1%, or greater than 97.2%, or greater than 97.3%, or greater than 97.4%, or greater than 97.5%, or greater than 97.6%, or greater than 97.7%, or greater than 97.8%, or greater than 97.9%, or greater than 98.1%, or greater than 98.2%, or greater than 98.3%, or greater than 98.4%, or greater than 98.5%, or greater than 98.6%, or greater than 98.7%, or greater than 98.8%, or greater than 98.9%, or greater than 99.1%, or greater than 99.2%, or greater than 99.3%, or greater than 99.4%, or greater than 99.5%, or greater than 99.6%, or greater than 99.7%, or greater than 99.8%, or greater than 99.9%.

Other Components

In another group of embodiments, the present invention provides a urea-nitrogen stabilizer composition that includes other components, including but not limited to: a conditioning agent, an anti-caking agent, a hardening agent, a pH control agent, a dye; and combinations thereof.

Examples of a conditioning agent include, but are not limited to mineral oil and the like. In some embodiments, the conditioning agent is added to the urea-nitrogen stabilizer composition after it is solidified into granules, prills, etc. In one embodiment, the conditioning agent is combined with the urea-nitrogen stabilizer composition in a ratio of about 3:1 urea-nitrogen stabilizer composition to conditioning agent.

In some aspects, an acidic compound can be included as a pH control agent maintain or to adjust the pH of the molten urea-nitrogen stabilizer composition. Illustrative acids can include, but are not limited to, mineral acids such as hydrochloric acid, sulfuric acid, nitric acid, phosphoric acid, acetic acid or any combination thereof.

In some aspects, a basic compound can be included as a pH control agent to maintain or to adjust the pH of the molten urea-nitrogen stabilizer composition. Illustrative base compounds for adjusting the pH can include, but are not limited to, ammonia, amines, e.g., primary, secondary, and tertiary amines and polyamines, sodium hydroxide (NaOH), potassium hydroxide (KOH), or a combination thereof.

In some aspects, another pH control agent or buffering agent can be included to maintain or to adjust the pH of the molten urea-nitrogen stabilizer composition. Illustrative pH buffering compounds can include, but are not limited to, triethanolamine, sodium borate, potassium bicarbonate, sodium carbonate, potassium carbonate, or any combination thereof.

Examples of an anti-caking agent include, but are not limited to lime, gypsum, silicon dioxide, kaolinite, or PVA in amounts from approximately 1 to approximately 95% by weight, in addition to the active substance mixture.

As noted herein, it is typical to add UF 85 to molten urea to increase its hardness. Accordingly, the amount of UF 85 and (free formaldehyde) is about 0.3 wt %, to about 0.4 wt. %, to about 0.5 wt. % of the total urea-nitrification inhibitor composition.

The pigments or dyes can be any available color are typically considered non-hazardous. In some embodiments, the dye is present in less than about 1 wt %, about 2 wt. % or less than about 3 wt. % of the urea-nitrogen stabilizer composition.

The additional components may be added to molten urea without a carrier, or with a solid or liquid carrier like the nitrogen stabilizer composition. The additional components can be mixed with the nitrogen stabilizer composition and added to the molten urea simultaneously, or they can be separately added, previous to, simultaneously with or subsequent to adding a nitrogen stabilizer composition.

The content of the additional components can be from about 1 to about 99 percent by weight of the composition. For example, the amount of the additional components in the composition can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or about 99% by weight of the total granular fertilizer composition.

Processes for Making the Compositions

Incorporation of the Nitrogen Stabilizer Compositions into the Urea Melt

In at least one specific embodiment, the invention sets forth a method of producing the molten urea-nitrogen stabilizer composition as described herein, comprising the step of: contacting the molten urea with the nitrogen stabilizer composition.

In at least one other specific embodiment, the invention sets forth a method of producing a granular composition as described herein, comprising the steps of:

contacting the molten urea with the nitrogen stabilizer composition; and forming the molten urea-nitrogen stabilizer composition into granules.

For example, the nitrogen stabilizer may be incorporated by blending solid nitrogen stabilizer, nitrogen stabilizer dispersed on a solid carrier, or a concentrated solution of the nitrogen stabilizer that is not composed entirely of NMP (or, more generally, of amide solvents) directly with molten urea. This provides a simple, convenient, and effective method of producing the granular compositions.

In some aspects of the present invention, the urease inhibitor, such as NBPT, is incorporated into the molten urea-nitrogen stabilizer composition by blending a solid form of the nitrogen stabilizer directly without a carrier or a concentrated mixture of urease inhibitor with a carrier of this invention ("a urease inhibitor composition") directly with molten urea at a temperature of about 266° F. to about 275° F. before the granulation or prilling of the urea in a conventional urea production facility. In certain aspects, sufficient mixing is employed during this blending step to assure that the urease inhibitor composition is homogeneously distributed throughout the molten urea before the melt cools and solidifies in the subsequent granulation step.

The concentrated urease inhibitor composition used in producing the molten urea-urease inhibitor composition of this invention may contain between about 20% and 80% urease inhibitor by weight, and in certain aspects between about 50% and about 75% urease inhibitor by weight. The concentrated urease inhibitor composition of this invention may be prepared by dissolving a urease inhibitor as illustrated in Example 1; by dispersing urease inhibitor on a solid carrier as illustrated in Examples 2 or 3; or by incorporating the carrier into the urease inhibitor production system in order to produce a urease inhibitor composition, rather than recover solid urease inhibitor. In certain aspects, urease inhibitor compositions remain stable over extended periods of time and over temperatures ranging from about 30° F. to about 120° F. Thus, the concentrated urease inhibitor compositions of this invention can be managed using conventional liquid or solid storage, transportation, and addition equipment. The amount of concentrated urease inhibitor compositions added to molten urea in accordance with this invention depends on the desired urease inhibitor content of the granular composition and on the urease inhibitor content of the concentrated urease inhibitor carrier, and can be readily calculated by those skilled in the art.

Because of the urease inhibitor is used neat or in a concentrated form, only very limited quantities of a carrier of this invention need be introduced into the urea along with the urease inhibitor. In one example, the urease inhibitor is used neat. In other examples, if the urease inhibitor content of a concentrated urease inhibitor solution used to incorporate the urease inhibitor in the fertilizer composition is 70% and the urease inhibitor content of a resulting fertilizer composition is 0.07%, the solvent content of the resulting fertilizer composition is at most 0.03%. When possible, a volatile or non-toxic carrier, which allows either more complete removal of the carrier by drying or fewer effects upon release of the carrier into the environment.

In some aspects of the present invention, in addition to a urease inhibitor such as NBPT, another additive, such as a nitrification inhibitor is also added to and blended with the molten urea before its granulation. Several methods can be used for the introduction of nitrification inhibitor into the molten urea. If available as a powder or in granular form, the nitrification inhibitor can be fed into a stream of molten urea using a conventional solids feeding device. In some aspects, the nitrification inhibitor may be dissolved in a relatively small quantity of molten urea, as for example in a side stream of molten urea in a urea plant, to form a concentrated nitrification inhibitor solution in molten urea that is then metered into the main stream of the molten urea. In some aspects, the nitrification inhibitor may be incorporated into the concentrated urease inhibitor compositions described herein and introduced into the molten urea along with the urease inhibitor.

In certain aspects, regardless of the method selected to introduce the nitrification inhibitor into the molten urea, sufficient mixing should be provided to facilitate homogenous distribution of the nitrification inhibitor throughout the urea melt. The homogeneous distribution of both urease inhibitor and nitrification inhibitor in the granular fertilizer compositions of this invention enhances the performance of these compositions in terms of their ability to promote plant growth.

The order in which the urease inhibitor and nitrification inhibitor are added to the molten urea in some aspects of this invention's methods is flexible. Either urease inhibitor or nitrification inhibitor may be introduced first, or both of these components may be added simultaneously. Initial addition of nitrification inhibitor can provide adequate time for both the dissolution and uniform distribution of the nitrification inhibitor in the molten urea before the granulation step. A convenient point for the addition of nitrification inhibitor to molten urea in a urea production plant would be before or between the evaporation steps used to reduce the water content of the molten urea. A concentrated urease inhibitor carrier, however, is in certain aspects introduced into the molten urea just before the granulation or prilling step with only sufficient retention time in the melt to allow for distribution of the urease inhibitor in the melt.

In some aspects, inclusion of a nitrification inhibitor or further component in the molten urea-urease inhibitor composition (e.g., by addition to the mixture) may inhibit crystallization of the urea, allowing processing of the mixture at lower temperatures less likely to produce biuret side products. Addition of about 4%, 5%, 6%, 8%, 10%, or 15% (w/w) of a nitrification inhibitor such as DCD may provide a final composition with superior products. See, e.g., DE 197 44 404.

In some aspects, the retention time of the melt between the point of urease inhibitor addition and the granulation step is less than 5 minutes or even less than 1 minute. In certain other aspects, the retention time is as little as about 50, or 40, or 30, or 29, or 28, or 27, or 26, or 25, or 24, or 23, or 22, or 21, or 20, or 19, or 18, or 17, or 16, or 15, or 14, or 13, or 12, or 11, or 10, or 9, or 8, or 7, or 6, or 5, or 4, or 3, or 2, or 1 seconds. Longer retention times may result in partial decomposition of the urease or nitrification inhibitor, higher concentrations of biuret and/or reduced effectiveness of the fertilizer composition.

In one embodiment, the present invention provides an urea-nitrogen stabilizer composition that substantially is made by contacting molten urea with the nitrogen stabilizer composition of the present invention. Thus in one embodiment, the urea-nitrogen stabilizer composition is a composition of molten urea and the nitrogen stabilizer composition. In another embodiment, the molten urea-nitrogen stabilizer composition is cooled to form a solid urea-nitrogen stabilizer composition. In one group of embodiments, the the nitrogen stabilizer composition is homogeneous within both the molten and solid urea-nitrogen stabilizer composition.

After cooling the solid urea-nitrogen stabilizer composition can take a variety of solid forms depending on how the molten urea-nitrogen stabilizer is cooled. Examples of solid forms include but are not limited to a granule, a prill, a pellet, a pastille, or a compounded form. Thus in one embodiment, the cooling may take place in a granulation apparatus, a prilling apparatus, a pelletizing apparatus, a compounding apparatus, or the like. Examples of a suitable granulation apparatus includes, but is not limited to a falling curtain granulation apparatus, agglomeration granulation apparatus, and a drum granulation apparatus. In one embodiment, the present invention provides a method, wherein the granulation apparatus is a drum granulation apparatus, optionally with variable speed drum. In one embodiment, the present invention provides a method wherein the drum speed is at least from about 40 to about 60 rpm.

In one embodiment, the present invention provides an method, wherein the granulation seed is made from solid urea, a solid form of a nitrification inhibitor, a solid form of a urease inhibitor or combinations thereof.

Depending on the form, the solid urea-nitrogen stabilizer composition can have a variety of particles sizes depending on how the composition is cooled. In one embodiment, the present invention provides an urea-nitrogen stabilizer composition, wherein the majority of the solid urea composition has a particle size of from about 0.84 to about 4.76 millimeters.

In one embodiment, the present invention provides a urea-nitrogen stabilizer composition, wherein the spherocity is at least about 0.9.

In one embodiment, the present invention provides a urea-nitrogen stabilizer composition, wherein the crush strength is at least about 3, at least about 4, at least about 5, at least about 6, at least about 7, at least about 8, at least about 9 lbs.

In one embodiment, the present invention provides an method of producing a solid urea-nitrogen stabilizer composition comprising: a) forming molten urea; b) adding said inhibitor composition; and c) cooling the molten urea-nitrogen stabilizer composition to form said solid urea-nitrogen stabilizer composition.

In one embodiment, the present invention provides a method of producing a solid urea-nitrogen stabilizer composition comprising: a) urea; and b) an inhibitor composition selected from the group consisting of a urease inhibitor composition and a nitrification inhibitor composition, and combinations thereof; wherein at least on inhibitor composition comprises a urease inhibitor; wherein the amount of the urease inhibitor is less than 0.2 weight percent based on the total weight of the urea-nitrogen stabilizer composition, the method comprising: a) forming molten urea; b) adding said urease inhibitor composition and optionally to form a molten urea-nitrogen stabilizer composition; and c) cooling the molten urea-nitrogen stabilizer composition to form said solid urea-nitrogen stabilizer composition; wherein the time between adding the urease inhibitor composition to cooling the molten urea-nitrogen stabilizer composition is less than 20 seconds.

In one embodiment, the present invention provides an method of producing a solid urea-nitrogen stabilizer composition comprising: a) urea; and b) an inhibitor composition selected from the group consisting of a urease inhibitor composition and a nitrification inhibitor composition, and combinations thereof; wherein at least on inhibitor composition comprises a urease inhibitor; wherein the amount of the urease inhibitor is less than 0.2 weight percent based on the total weight of the urea-nitrogen stabilizer composition, the method comprising: a) forming molten urea; b) adding said urease inhibitor composition and optionally to form a molten urea-nitrogen stabilizer composition; and c) cooling the molten urea-nitrogen stabilizer composition to form said solid urea-nitrogen stabilizer composition; wherein the degradation of the urease inhibitor is less than about 1 weight percent based on the initial weight of the urease inhibitor before addition.

In one embodiment, the present invention provides an method, wherein the inhibitor composition is further mixed with the molten urea after addition by a method selected from the group consisting of in-line mixing, spiroagitation, or combinations thereof.

In one embodiment, the present invention provides an method, wherein the inhibitor composition is added at a flow rate of from about 10 lbs/hr to about 2200 lbs/hr.

In one embodiment, the present invention provides an method, wherein the urease inhibitor composition is between about 90 to 100° F. before being added to said molten urea.

In one embodiment, the present invention provides an method, wherein the internal temperature in the cooling apparatus is at least about 95° C., to about 100° C., to about 105° C., to about 110° C., to about 115° C., to about 120° C., to about 125° C., to about 130° C., to about 135° C., to about 140° C., to about 145° C., to about 150° C., to about 155° C., to about 160° C., to about 165° C., to about 170° C., to about 175° C., to about 185° C., to about 190° C., to about 200° C., to about 105° C., to about 210° C., to less than about 215° C.

In one embodiment, the present invention provides an method, wherein the relative humidity in said cooling apparatus is between about 40 to 95%.

In one embodiment, the present invention provides an method, wherein said another component is added to the solid urea-nitrogen stabilizer composition by coating after cooling of the urea-nitrogen stabilizer composition.

In one embodiment, the present invention provides an method, wherein the process is a batch process.

In one embodiment, the present invention provides an method, wherein the process is continuous.

In one embodiment, the present invention provides an method of enhancing the growth of plants by applying to soil a solid urea-nitrogen stabilizer composition the present invention.

In one embodiment, the present invention provides a system for mixing an inhibitor composition selected from the group consisting of a urease inhibitor composition and a nitrification inhibitor composition, and combinations thereof; with molten urea, the system comprising, a urea synthesizing unit, a water evaporating unit down stream from said urea synthesizing unit, at least one feeding apparatus for feeding said inhibitor composition into, at least one mixing apparatus wherein the molten urea and inhibitor composition are mixed.

In one embodiment, the present invention provides a system for producing a solid urea-nitrogen stabilizer composition comprising: a) urea; and b) an inhibitor composition selected from the group consisting of a urease inhibitor composition and a nitrification inhibitor composition, and combinations thereof; the system comprising, a urea synthesizing unit, a water evaporating unit, a inhibitor composition feeding apparatus, a mixing apparatus for mixing molten urea and said inhibitor composition; and a cooling apparatus into which the molten urea-nitrogen stabilizer composition is fed and cooled and said solid urea-nitrogen stabilizer composition is formed.

In one embodiment, the present invention provides a system for producing a solid urea-nitrogen stabilizer composition comprising: a) urea; and b) an inhibitor composition selected from the group consisting of a urease inhibitor composition and a nitrification inhibitor composition, and combinations thereof; the system comprising: 1) a urea synthesizing unit for providing a molten urea, 2) a water evaporating unit, 3) a inhibitor composition feeding apparatus for adding an inhibitor composition into, 4) at least one mixing apparatus configured to receive and mix said molten urea and said inhibitor composition; and 5) a cooling apparatus into which the molten urea-nitrogen stabilizer composition is fed and cooled and said solid urea-nitrogen stabilizer composition is formed; characterized in that at least one mixing apparatus is arranged between said urea synthesizer unit and the cooling apparatus.

In one embodiment, the present invention provides a system wherein the distance between said mixing apparatus and said cooling apparatus is sufficient to provide uniform mixing of said inhibitor and minimize decomposition of said inhibitor.

In one embodiment, the present invention provides a system further comprising a flow control system coupled to the inhibitor composition feeding apparatus, the urea synthesizing unit, or the water evaporating unit.

In one embodiment, the present invention provides a system wherein said flow control system comprises a flow meter and a variable speed pump.

In one embodiment, the present invention provides a system further comprising a) a means for monitoring at least one of: a) the amount of water in the molten urea; or b) the amount of nitrogen stabilizer in the molten urea.

In one embodiment, the present invention provides a system wherein the system comprises a main line connecting said water evaporating unit to said cooling unit, wherein said molten urea flows through said main line to said cooling unit.

In one embodiment, the present invention provides a system wherein said main line connects said water evaporating unit to said mixing unit.

In one embodiment, the present invention provides a system wherein further comprising a side line connecting said main line to said mixing unit, said mixing unit discharging to said main line.

In one embodiment, the present invention provides a system wherein the system is continuous.

In one embodiment, the present invention provides a system comprising a plurality of mixing units.

In one embodiment, the present invention provides a system wherein said mixing apparatus is at the juncture of an output from the inhibitor composition feeding apparatus and the main line or the side line and.

In one embodiment, the present invention provides a system wherein the inhibitor composition feeding apparatus has sufficient flow to intermix said inhibitor composition and said molten urea.

In one embodiment, the present invention provides a system wherein the mixing apparatus is separate from the evaporator.

In one embodiment, the present invention provides a system, capable of producing at least about 1000 pounds of urea/hr.

In one embodiment, the present invention provides a system, wherein said cooling apparatus and apparatus means are arranged to provide a uniform concentration of said inhibitor composition and to minimize decomposition of said inhibitor composition.

In one embodiment, the present invention provides a system wherein said inhibitor composition feeding apparatus comprises a storage tank and a pump.

In one embodiment, the present invention provides a mixing apparatus comprising: 1) a means for feeding molten urea adapted to feed molten urea into; 2) at least one mixing means adapted to receive said molten urea; 3) a feeding means adapted to add an inhibitor composition into the mixing means; 4) a fluid outlet connected to the mixing means; through which fluid may flow.

In one embodiment, the present invention provides a mixing apparatus wherein said mixing means comprises a mixing tank and an impeller mounted in a housing within said tank so as to promote fluid flow within the tank.

In one embodiment, the present invention provides a mixing apparatus wherein said inhibitor composition feeding means is positioned in a longitudinal direction above said mixing means comprises a mixing tank and an impeller mounted in a housing within said tank so as to promote fluid flow within the tank.

In one embodiment, the present invention provides a mixing apparatus further comprising at least one of 1) a means for controlling the feed of said inhibitor composition; a means for controlling the feed of said molten urea; 3) a means for controlling the speed of said impeller, and a sight glass in said mixing tank.

In one embodiment, the present invention provides a feeding means of said inhibitor composition are arranged to provide a uniform concentration of the additive in the urea input flows.

In one embodiment, the present invention provides a means to control the temperature of said molten urea-nitrogen stabilizer composition.

In one embodiment, the present invention provides a composition feeding apparatus suitable for feeding a solid composition comprising 1) a solid inhibitor composition input, 2) and a conveying means selected from a) a screw conveying means; b) a pneumatic conveying means; and combinations thereof.

In one embodiment, the present invention provides a composition feeding apparatus suitable for feeding a solid inhibitor composition includes a hopper.

In one embodiment, the present invention provides an apparatus made from a corrosion resistant material. In one embodiment, the corrosion resistant material is stainless steel or plastic.

In at least one specific embodiment, the invention sets forth a granular composition prepared by forming into granules a molten urea-nitrogen stabilizer composition as described in any of the various aspects herein.

In at least one other specific embodiment, the invention sets forth a fertilizer composition comprising a granular composition as described in any of the the various aspects herein.

Cooling into a Solid Form

In some aspects, after either the urease inhibitor and/or the nitrification inhibitor are introduced into the urea melt, the molten composition is converted into a solid form. Examples of solid forms include, but are not limited to, granules, prills, and the like.

Prills

In one embodiment the solid form is a prill. Prills of the molten urea-nitrogen stabilizer composition can be produced by standard techniques and offers the advantage that the prills can be made more economically than granules.

Granules

In another embodiment the solid form is a granule. Granules of the molten-urea-nitrogen stabilizer composition can be produced by standard techniques such as fluidized bed, drum granulation, sprouted bed granulation, and the like. Granulation offers the advantages of having a larger particle size, a higher degree of sphericity, a higher crush and/or impact strength, and hence, storability. In one embodiment, the granulation is drum granulation. In drum granulation, the the molten urea-nitrogen stabilizer composition is sprayed from a rotating, perforated drum onto a splash plate or sleeve to form granules. In some embodiments, the composition may be forced from the drum by higher pressure within its storage or feed tank, enhancing granulation by the drop in temperature as the pressurized gases expand. In some aspects, the gas used is an inert carrier gas, such as nitrogen. In some aspects, the spray area or plate may be cooled. See, e.g., GB 1069047.

In some aspects, nucleating or seed particles are used to trigger formation of the granular composition. Seed materials do no liquify under the conditions and timeframe of the granulation process. They can be up to about 50, 75, 100, 125, 150, 200, 250, 300, 400, or 500 microns in size. In some aspects, the seed material may be a material otherwise suitable for use as a solid carrier of the invention, such as clays, inorganic salts, sawdust, urea; or a solid form of the nitrogen stabilizer. In some aspects, the nucleating material is a smaller form of the granulated urea-nitrogen stabilizer composition or the like.

In some aspects, a self-regulating pump (e.g., a self-regulating centrifugal pump) is used to control the feeding of the molten composition or a concentrated solution thereof to the granulator to reduce residence time in the pipes conveying the mixture. In certain instances, such a pump is positioned between an evaporator for a urea solution (or the molten urea-nitrogen stabilizer composition) and the granulator itself. In certain instances, such a pump is positioned very close to, or directly attached to, the granulator itself. See, e.g., U.S. Pat. No. 7,753,985.

In some aspects, the granulator may include a scrubbing unit to capture dust from the granulation process before its release. In some aspects, the granulator may include a recycling unit to capture unused reactants (or side products) for re-use or conversion into reusable products. In certain aspects, the scrubbing or recycling unit may include treatment with water and a cooling gas before treatment with a mist collector. See, e.g., U.S. Pat. Nos. 7,682,425 and 8,080,687.

In some aspects, the recycling or scrubbing process may include an acid treatment to capture ammonia and basic impurities. See, e.g., U.S. Pat. Publ. No. 2011/0229394. In some aspects, the process may include treatment with an oxidant such as hypochlorite to decompose side products to more easily managed waste materials. See, e.g., U.S. Pat. Publ. No. 2011/0280779. In some aspects, the process may include treatment with an reductant to decompose side products such as nitrogen oxides. See, e.g., U.S. Pat. No. 8,147,784.

In some aspects, the granules exiting the granulation apparatus are sized. The undersized particles are cooled and recycled, while the oversized particles are cooled, ground, and then recycled into the granule forming apparatus. In one specific embodiment of the invention, granules which pass through a 4 mesh Tyler Series sieve (about 4.76 millimeters) and stay on a 20 mesh Tyler Series sieve (about 0.84 millimeters) are retained as product.

In other specific embodiments, granules of between about 2.0 and 4.0 mm are retained as product by selection of appropriate screens. In other specific embodiments, granules or prills between about 0.9 and 2.2 mm diameter, 0.7 and 1.2 mm, 1.0 and 3.0, 1.0 and 2.5 mm, 2.0 and 5.0 mm, 3.0 and 5.0 mm, 3.0 and 4.0 mm, 5.0 and 10.0 mm; 6.0 and 12.0 mm; and the like are produced.

In some aspects, the granules produced by the granulation apparatus are coated, whether before or after sizing. In some aspects, the coating can be a inert material designed to delay or to control release of the granule's active ingredients. In some other aspects, the coating is itself a fertilizer. In some other aspects, the coating includes multiple layers, some of which may be inert.

Additional possible variations usable in some aspects or embodiments of the the composition and the composition's production process are set forth in, e.g., U.S. Pat. Nos. 7,753,985; 6,176,630; 6,627,680; 6,203,730; and 4,943,308.

Pastilling

In another embodiment, the solid form is a pastille using for example, a Rotoform steel-belt pastillator. Advantages of this process is that the product is hard and uniform and the cooling apparatus is simple and needs less power and maintenance. However the solid form of the urea is non-spherical, and the capacity can be limited e.g. about 300 t/d.

The rate of injection was 1.4 kilograms of NBPT per metric ton of urea, which corresponds to roughly 5.21 liters of NBPT/NMP solution per metric ton of urea. The melted products stored at 4° C. in sealed bags prior to use in the urea melt produced a more homogeneous product with superior stability than coating the urea granule. NBPT incorporated within the urea melt was more stable under a range of storage conditions and produced a more homogeneous product than coating. The half-life of NBPT is about six months for surface-treated urea and more than one year if NBPT is injected into the melted urea before granulation. Others have found shorter half-lives (Kincheloe, 1997b), depending on conditions, in particular temperature.

Embodiments of the present invention also provide additional cooling and screening steps.

System and Apparati

Embodiments of the present disclosure also provide systems and apparati for making the urea-inhibitor compositions of the present invention. The standard procedure for forming solid urea involves synthesizing urea, adding UF85 to the resulting molten urea to increase the hardness of the final solid urea product; evaporating excess water from the molten urea composition; and cooling the molten urea into a solid form, which can be in the form of a granule, pellet, prill, patille, or another shaped form depending on the process used to cool the molten urea. Because most solid urea does not contain additives other than UF85, systems and apparati that are suitable for adding other materials are not commercially available. In addition, because most solid urea does not contain additives, there is a need to provide systems and apparati that will limit the downtime of the urea manufacturing equipment in making such forms of urea. Also because some of these materials, such as NBPT and DCD can be difficult to handle, there is a need to be able to add these materials without significantly increasing the time that the urea is in a molten state which increases the biuret content.

In one embodiment, the present invention provides and mixing apparatus that is used to mix molten urea and a inhibitor composition of the present invention. In one embodiment, the mixing apparatus comprises: 1) a means for feeding molten urea adapted to feed molten urea into; 2) at least one mixing means adapted to receive said molten urea; 3) a feeding means adapted to add an inhibitor composition into the mixing means; 4) a fluid outlet connected to the mixing means; through which fluid may flow.

Mixing

Injectors and Mix Tank Agitators

In one group of embodiments, said mixing means is a mixing tank with an agitator. In one embodiment, the agitator is an impeller mounted in a housing within said mixing tank that promotes fluid flow within the tank.

The size of the tank is proportional to the production rate of molten urea being produced and the mixing time required for the inhibitor being added. In one embodiment, the present invention provides a mixing tank that has a volume of between about 10 to 10,000 gallons. In one example, where molten urea is being produced in at least 1000 pounds/hr and the inhibitor is DCD, the mixing tank can range from about 50 to about 60 to about 70 to about 80 to about 90 to about 100 gallons. In one embodiment of the present invention, the mixing tank is made from a non-corroding material such as stainless steel. The tank may optionally have a rounded or funneled bottom which promotes fluid flow to at least one output in the bottom of the mixing tank. The mixing tank, optionally may have a sight glass, which provides a means to observe the mixing of the molten urea and the inhibitor composition. Any size sight glass, suitable for observing the mixing of the composition can be used. The mixing apparatus may optionally include a means of controlling the temperature of the composition. In one group of embodiments, the mixing apparatus is jacketed to which water of a certain temperature or steam can be provided to control the temperature.

The impeller can be made of any suitable material. In one group of embodiments, the impeller is made from a corrosion resistant material, including but not limited to plastic or stainless steel. In one embodiment, the material is plastic. In one embodiment, the material is stainless steel. The size of the impeller may depend on the size of the mixing tank used.

For example for a mixing tank of about 80 gallons, an impeller with about a 1.5"×52" shaft with a 10.5" diameter impeller is sufficient. The impeller can be driven by any suitable motor. Non-limiting examples of a motor that can be used include a standard 1 HP motor.

In another group of embodiments, the mixing apparatus may be an injection quill that is positioned within the tubing which feeds the molten urea.

In one group of embodiments, the mixing apparatus has an inhibitor composition feeding means. The feeding means can feed either a solid inhibitor composition or a liquid inhibitor composition.

For liquid inhibitor compositions, the inhibitor composition feeding means comprises a liquid holding tank suitable for containing a liquid composition; tubing through which fluid can flow from the liquid holding tank to the mixing apparatus; and a pump connected to the line through. In some embodiments, the liquid inhibitor feeding apparatus can optionally include one or more filters connected to the line such that the liquid inhibitor composition flows through the filter. In some embodiments, the liquid inhibitor feeding apparatus can optionally include one or more vents connected to the line such that fluid and or gas pressure can be released from the line.

The size of the tubing is not particularly important and can vary depending on the desired flow rate of the liquid inhibitor composition. In some embodiments, the tubing has a diameter of about ⅛, ¼, ⅜, ½, ⅝, ¾, 1, 1 and ⅛, 1 and ¼, 1 and ⅜, 1 and ½, 1 and ⅝, 1 and ¾, 1 and ⅞, 1 and 2 inches in diameter. The tubing can be made of any suitable material for conveying the liquid inhibitor composition. In one group of embodiments, the tubing material is made from non-corroding materials such as plastic or stainless steel. In some embodiments, the tubing is capable of handling pressure less than or equal to one atmosphere. In some embodiments, the tubing is capable of handling pressures over one atmosphere. In some embodiments, the tubing is capable of handling pressures up to and including about 135 p.s.i. In some embodiments, the feeding apparatus optionally includes one or more vents or drains for relieving pressure or diverting liquid from the tubing.

In some embodiments, the holding tank may optionally include an agitating means, which includes, but is not limited to, motor driven impeller.

While the orientation of said feeding means is not particularly important, in one embodiment, the inhibitor composition feeding means is positioned in a non-horizontal, longitudinal direction above the midline of said mixing tank, which can be useful if any head pressure develops in the mixing tank during mixing. comprises a mixing tank and an impeller mounted in a housing within said tank so as to promote fluid flow within the tank.

In one group of embodiments, the means for controlling the feed of said inhibitor composition can be a valve, such as a position valve; a variable speed pump, and combination thereof and the like.

In another group of embodiments the means for controlling the speed of said impeller can be a variable speed motor.

In another group of embodiments the apparatus is characterized in that said feeding means of said inhibitor composition are arranged to provide a uniform concentration of the additive in the urea input flows.

FIG. 1 is a flow chart of an illustrative embodiment of a method of forming a urea-nitrogen stabilizer composition. In block 1, the molten urea is formed. In block 2, the molten urea is evaporated. In block 3, molten urea and the nitrogen stabilizer composition are mixed together to form urea-nitrogen stabilizer composition. In block 4, urea-nitrogen stabilizer composition is cooled to form a solid urea-nitrogen stabilizer composition. In block 5, the urea-nitrogen stabilizer product is screened for the proper size. In block 6, if the the urea-nitrogen stabilizer product is too large or too small it is recycled either directly (too small) or by first crushing the oversized product.

Figure 2:
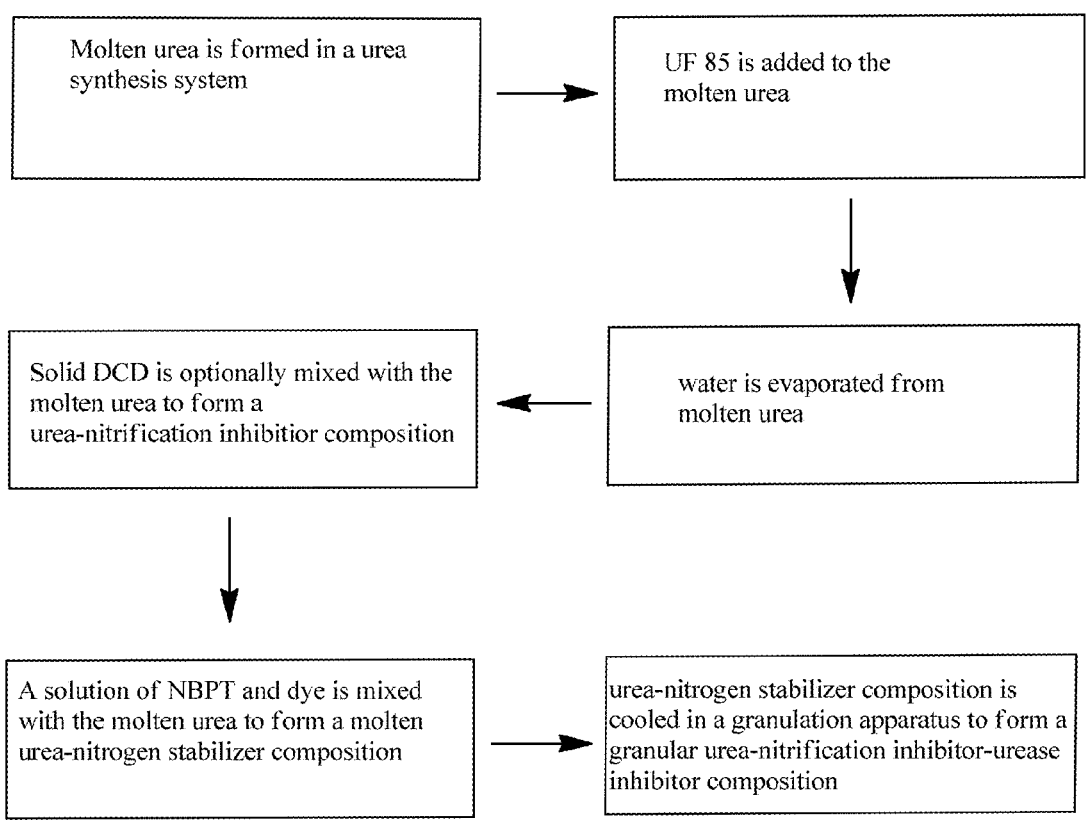
FIG. 2: Illustrates a flow diagram of the overall mixing system starting with introduction of molten urea, UF85, DCD, NBPT and a dye as they are fed into a mix tank before the intermediate product is conveyed to a granulation apparatus.

FIG. 2 is a flow chart of an illustrative embodiment of forming a urea-nitrogen stabilizer composition. In block 1, the molten urea is synthesized. In block 2, the hardening agent UF85 is added. In block 3, the water is evaporated from the molten urea. In block 4, solid nitrification inhibitor DCD with or without a solid carrier is mixed together with the molten urea to form urea-nitrogen stabilizer composition. In block 5, a liquid urease inhibitor (NBPT) and dye mixture is mixed together with the molten urea to form urea-nitrogen stabilizer composition composition. In block 6, the urea-nitrogen stabilizer composition is cooled in a granulation apparatus.

Figure 3A:
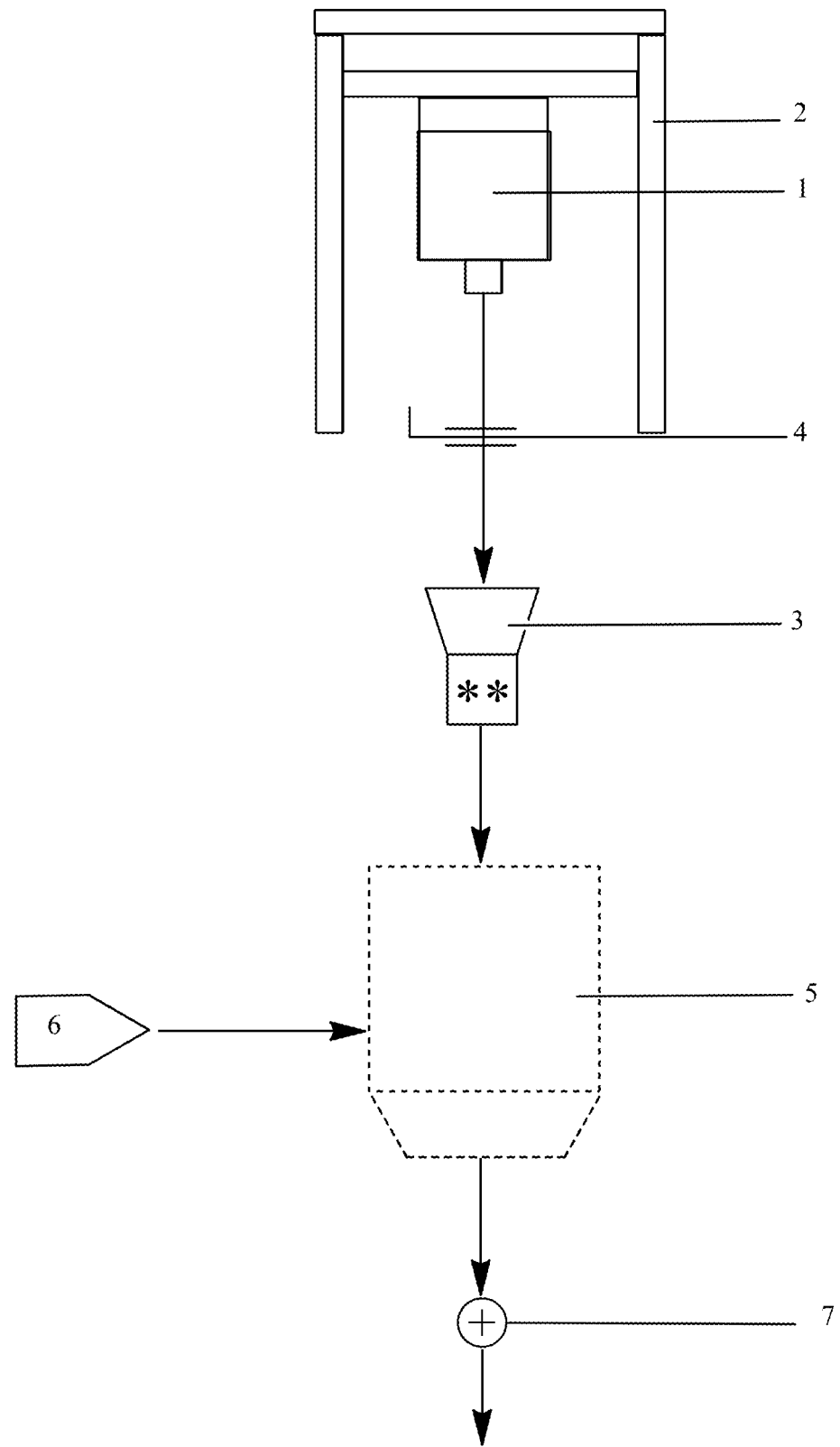
FIG. 3A-B: Illustrates an example of a solid nitrification stabilizer conveying system before being mixed.

FIGS. 3A-6 illustrate one system for producing the compositions of the present invention. FIG. 3A illustrates an apparatus for conveying a solid nitrogen stabilizer composition to feed into a urea synthesis system. In one embodiment, the nitrogen stabilizer is for feeding solid compositions (i.e. the solid nitrogen stabilizer with or without a solid carrier). In one embodiment, the solid nitrogen stabilizer feeding apparatus includes a sack unloader apparatus 2; a hopper bin which optionally includes a grizzly and/or crusher 3; an optional storage bin 5; and a air conveying apparatus 6 interfaced with the system to feed the solid nitrogen stabilizer composition into a mixing apparatus for solid or liquid compositions shown in FIG. 5. The solid nitrogen stabilizer unloading apparatus is set up such that Supersack 1 containing the solid nitrogen stabilizer and/or a solid carrier is hung on a frame of the sack unloader apparatus for example, with the assistance of a forklift. The Supersack 1 containing the solid nitrogen stabilizer, with or without a solid carrier, is opened and the contents flows out of an opening in the supersack into the hopper bin 3. The flow from the supersack can be mediated by the size of the opening in the supersack. The solid nitrogen stabilizer feeding apparatus may optionally comprise an adjustable discharge deck with a slide gate interfaced with a piston actuator 4 for flow control. Alternatively or in addition, a pneumatic piston in contact in with the super sack (not shown) may be activated concurrently to facilitate the flow of the solid nitrogen stabilizer composition from the bag. In some embodiments, the solid nitrogen stabilizer composition may be susceptible to caking or clumping or may require further mixing, thus in some embodiments, the apparatus may include another intermediate bin into which the solid nitrogen stabilizer composition may be placed and the clumps broken up. This bin may interfaced before or after the adjustable discharge deck with the slide gate 4. The flow of the solid nitrogen stabilizer composition from the system can be mediated by the air conveying system 6, which includes an airlock 7. The optional solid nitrogen stabilizer composition storage unit 5, stores the solid nitrogen stabilizer composition when it is not being used. The solid nitrogen stabilizer composition is then directed into a solid nitrogen stabilizer conveying system shown in FIG. 3B. The solid nitrogen stabilizer conveying system includes at least one hopper 8 which is interfaced with a means for promoting the flow of the solid nitrogen stabilizer composition into a mixing apparatus shown in FIG. 5. The means may include a) a motor driven screw conveyer (auger) 10; a feed elevator 11; an intermediate bin equipped with a discharger 12; another air conveying system or combinations thereof assists in promoting the flow of the solid nitrogen stabilizer composition. The specific combination of means employed may depend on the topography of urea facility. In some embodiments, the apparatus may also include a means to divert some of the nitrogen stabilizer for other uses 13.

In another group of embodiments, the nitrogen stabilizer composition is liquid composition (i.e. a solid nitrogen stabilizer in a liquid carrier or a liquid nitrogen stabilizer). In one embodiment, the liquid nitrogen stabilizer feeding apparatus includes a holding or storage tank 14 interfaced with a pump 15. The liquid nitrogen stabilizer composition may be put into the holding or storage tank 14 premixed and solvated or the apparatus may optionally include a means to feed the nitrogen stabilizer into a mixing apparatus where a liquid carrier or other additive, such as a dye is added. Alternatively, the liquid nitrogen stabilizer composition may be put into the holding or storage tank 14 premixed and solvated or the apparatus may optionally include a means to feed a solid form of the nitrogen stabilizer into a mixing apparatus where the liquid carrier is added. The liquid nitrogen stabilizer composition storage tank can be sized for any storage capacity e.g. one (1) day. The liquid nitrogen stabilizer can be used neat or may contain other solid or liquid additives, such as a dye. Thus in one group of embodiments, the liquid nitrogen stabilizer holding or storage tank 14 may be interfaced with a liquid nitrogen stabilizer mix tank 17 before it is fed into the mix tank with molten urea. The flow from the holding tank can be mediated by a pump 15 by means of a flow regulator. Thus another composition such as a solvent, dye, or other additive, and the like and combinations thereof, may be put into another holding or storage tank 16 which is fed into the nitrogen stabilizer into a mixing tank 17. In some embodiments, the liquid nitrogen stabilizer mix tank 17 may include a motor driven agitator 18 which may include an impeller on a shaft attached to a motor via a flange. Both the holding and storage tanks and the mixing tanks can be equipped with a heating element, such as a steam line 19. In some embodiments, the apparatus may also include a means to divert some of the nitrogen stabilizer for other uses, filters 20 without or with drains 22, or vents 21. In some embodiments, the system has at least one or more nitrogen stabilizer loading and conveying apparatus. In some embodiments, the system has at least two or more nitrogen stabilizer loading and conveying apparati, so that at least one can be in operation while another is being loaded.

Figure 5:
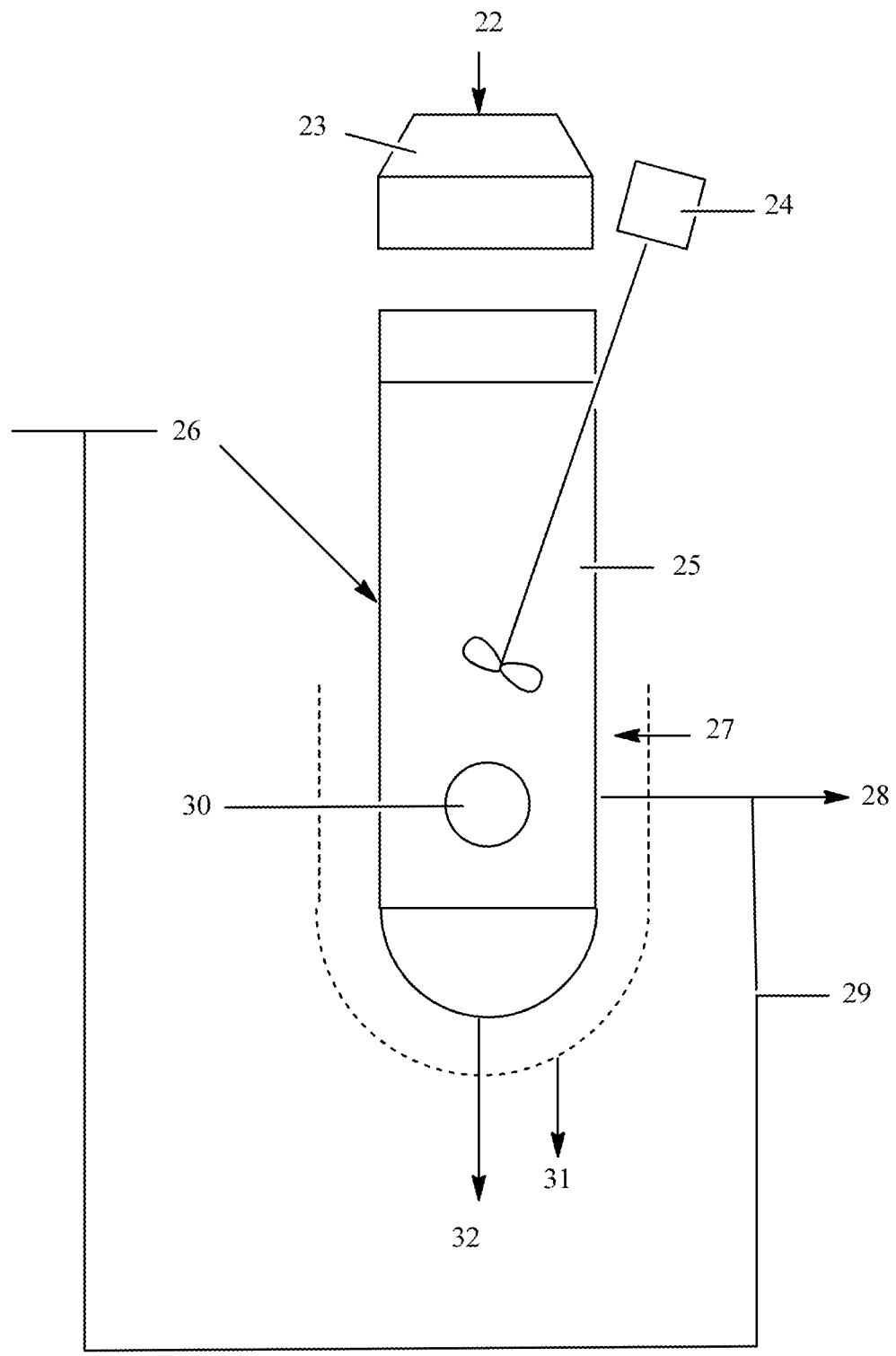
FIG. 5: Illustrates an example of the mixing tank system for the molten urea and other components before the intermediate product is conveyed to a cooling apparatus.

The solid or liquid nitrogen stabilizer composition is then directed a mixing tank 25, for example that shown in FIG. 5. In some embodiments, the liquid or solid nitrogen stabilizer mix tank 25 may include a motor driven agitator 24 which may include an impeller on a shaft attached to a motor via a flange. The mixing tank 25 is also feed with molten urea.

In accordance with the present invention, urea is supplied from an adjacent urea synthesis system 22 and introduced into mixing tank 25 after the evaporator unit(s) 23 of the urea synthesis system. Any suitable urea synthesizer and evaporator can be used. The mixing apparatus can be set up such it that is positioned below the output from any standard urea evaporator or the urea can be pumped to a different location. The molten urea entering the mixing apparatus either flows downward with gravity or can be pumped into the mixing tank 25. The amount of molten urea added to the mixing tank is controlled in combination with a flow meter. The mixing apparatus also includes a inlet(s) 29 and/or 30 which can be fed by the liquid or solid nitrogen stabilizer composition conveying systems of FIGS. 3A-4. The mixing tank may include a jacket 27 into which steam may be injected to maintain the temperature of the molten urea-nitrogen stabilizer composition.

In some embodiments, synthesized molten urea from a urea synthesis apparatus is directly fed into the the mixing tank 25. In one group of embodiments, the molten urea is fed into the mixing tank 25 after the urea separator 22 and water evaporator systems 23 that are in typical urea synthesis facilities. In some embodiments, the apparatus may also include a means to divert some of the nitrogen stabilizer for other uses 32. In some embodiments, the system has at least one urea-nitrogen stabilizer mixing apparatus. In some embodiments, the system has at least two urea-nitrogen stabilizer mixing apparati, so that at least one can be unloading or mixing while another is being loaded or mixing.

In one group of embodiments the systems and apparatus in a continuous manner. In other words, the system does not need to be slowed or shut down when removing new product or adding new starting materials into the system. In other group of embodiments the systems and apparatus may be done in a batch process. In other words, the system is slowed or shut down when removing new product or adding new starting materials into the system.

In accordance with the improved machine system and process of the present invention, molten urea is treated with a nitrogen stabilizer prior to granulation. The treatment of the molten urea with the nitrogen stabilizer composition prior to granulation has advantages over prior systems and methods in that it provides a more efficient method and system for incorporating a nitrogen stabilizer into urea by using little or no NMP. If a liquid carrier is used, the carrier contains another solvent besides NMP. It has been found that not only is there better mixing and dispersion of the nitrogen stabilizer, but also the distribution of the nitrogen stabilizer in the urea granule is more uniform. According to the present invention, a machine system is described, wherein the urease inhibitor is more efficiently and uniformly incorporated in the urea, with it being possible to provide the nitrogen stabilizer uniformly dispersed within the urea granule. Specifically, it has been found that the ureas inhibitor composition is best applied to the molten urea by injecting the nitrogen stabilizer either sequentially into a tank of molten urea or continuously into a flow of molten urea, which is moving continuously through a mixing device, using one or more injectors with the flow characteristics of each injector being separately controlled. The flow of the molten urea and/or the mixing of the molten urea is in holding/mixing tank is done in a controlled manner which uniformly incorporates the injected nitrogen stabilizer composition into the molten urea before granulation. Heretofore, the NBPT is applied neat, or by first mixing it with a carrier as described above and then applying it to a composition of molten urea. Another advantage of injecting the urease inhibitor composition directly into the molten urea with the use of a liquid carrier involves both safety, dispersion of the nitrogen stabilizer within the molten urea and conservation of the liquid materials utilized. Thus, there is no off gassing due to using a volatile solvent, when NBPT is used neat or with a solid carrier. The off-gassing can run as high as 30% depending on the amount of solvent used, the temperature of the system and the like. This not only improves the economics of the system, but further reduces environmental and safety concerns. In one embodiment, the machine system in incorporating the nitrogen stabilizer composition directly into the molten urea, utilizes individual piston pumps having individually controlled flow characteristics for each injector which the nitrogen stabilizer composition (or other components). This provides for more uniform control of the application quantity and the correct chemical ratio of the materials to be incorporated into or onto the granules. Because the nitrogen stabilizer will be more uniformly distributed within the urea granule when incorporated into the molten urea before granulation, less nitrogen stabilizer needs to be used, as well as other components which may be used which help prevent nitrogen loss, such as nitrification inhibitors, controlled-release coatings, and the like. The invention, therefore, comprises an improved injection process and a machine system for injecting the solid or liquid nitrogen stabilizer composition.

The advantages of the present invention will be more readily apparent from the drawing, which describes in detail a present embodiment.

Figure 6:
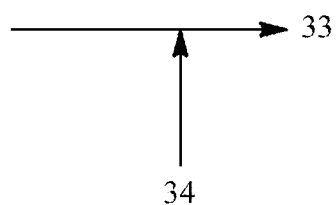
FIG. 6: Illustrates an alternative example of an in-line mixing system for the molten urea and other components before the intermediate product is conveyed to a cooling apparatus.

More than one mixing tank 25 can be used alternately so as to permit cleaning or repair of a mixing tank without need to close down the mixing operation. The mix tank can be mixed by motor and shaft means, as shown. The urea is passed through the mixing tank and after being uniformly mixed it is fed from the mixing tank to a cooling apparatus 28 or 33 by standard techniques as shown in FIGS. 5 and 6, respectively. The material from the mixing tank is conveyed at a temperature of about 180° F. or more to the cooling apparatus.

Other additives can be added with the nitrogen stabilizer composition (either in-line or into a mixing tank). Alternatively, other additives can be added to the stream of molten-urea/nitrogen stabilizer being conveyed to the granulator. Furthermore, other additives can be added to the granular fertilizer after granulation by standard coating techniques. Examples of other additives include pigmented materials for coloring the urea to identify it as a blended material.

The materials can be conveyed throughout the system by one or more pumps, such as a piston pump. Modulation of the amounts of materials can be done by flowmeter. Delivery rates can be adjusted during the process or preset on the flowmeter through a controller means (not shown) set at the predetermined delivery rate through a variable speed drive. Accordingly, there can be a constant and uniform flow of each composition being conveyed in the system.

The number and location of the pumps can obviously be varied depending on the components in the material ultimately desired. Moreover, as will be apparent, not all of the injectors need be used in any operation. This will depend upon the number and type of components desired end fertilizer desired.

In mixer shown in FIG. 6, an injector quill is arranged in line anywhere before the cooling apparatus.

Uses

The homogenous granular urea-based fertilizer composition of this invention can be used in all agricultural applications in which granular urea is currently used. These applications include a very wide range of crop and turf species, tillage systems, and fertilizer placement methods. Most notably, the fertilizer composition of this invention can be applied to a field crop, such as corn or wheat, in a single surface application and will nevertheless supply sufficient nitrogen to the plants throughout their growth and maturing cycles. The fertilizer composition of this invention is capable of supplying the nitrogen nutrient with greater efficiency than any previously known fertilizer composition. The new improved composition increases the nitrogen uptake by plants, enhances crop yields, and minimizes the loss of both ammonium nitrogen and nitrate nitrogen from the soil.

The rate at which the fertilizer composition of this invention is applied to the soil may be identical to the rate at which urea is currently used for a given application, with the expectation of a higher crop yield in the case of the composition of this invention. Alternately, the composition of this invention may be applied to the soil at lower rates than is the case for urea and still provide comparable crop yields, but with a much lower potential for nitrogen loss to the environment. It is of interest to illustrate the quantities of NBPT and DCD introduced into the soil when a given composition of this invention is applied as a fertilizer. For example, assuming that the composition is applied to the soil at a rate of 100 pounds per acre and that it contains 0.1% NBPT and 1% DCD, it can be readily calculated that the rates of NBPT and DCD application are 0.1 and 1.0 pounds per acre, respectively.

The utilization of two specific additives, one to inhibit the urease-catalyzed hydrolysis of urea and the other to inhibit the nitrification of ammonia, in the fertilizer composition of this invention offers an opportunity to tailor the make-up of the composition to match the nitrogen nutrient demand of a given crop/soil/weather scenario. For example, if conditions are such that the opportunity for ammonia losses through volatilization to the atmosphere is thereby diminished, the level of the NBPT nitrogen stabilizer incorporated into the formulation may be reduced, within the specified range, without also changing the level of the DCD nitrification inhibitor. The relative resistance of the fertilizer composition of this invention to urea hydrolysis and ammonia oxidation is controlled by properly selecting the NBPT to DCD weight ratio of the composition. This ratio should exceed a value of about 0.02, should preferably be between about 0.02 and about 10.0, and should most preferably be between about 0.04 and about 4.0. Homogenous fertilizer compositions with NBPT to DCD weight ratios near the higher end of these ranges will exhibit relatively higher resistance to urea hydrolysis than to ammonium oxidation, and vice versa. This independent control over the relative resistance of the composition to urea hydrolysis and ammonia oxidation is unattainable through the methods of prior art and provides unparalleled flexibility in meeting the nutrient demands of various crops under a broad range of soil/weather conditions.

The granular fertilizer composition of this invention offers a number of advantages over prior art. First and foremost, the crush strength and shelf-life exceed other known granular urea-based fertilizer composition. NBPT is less susceptible to decomposition by hydrolysis or other mechanisms when it is incorporated into the urea granule rather than coated on the surface. Furthermore, this invention provides safe ingredients. Another advantage is the cost savings associated with handling the NBPT has it does not require a second process step. In addition, coating is often done just prior to use, which can limit the amount of urea that can be coated if urea treatment facilities are not readily available. Consequently, the granular fertilizer compositions of this invention facilitate maximum crop yields without safety and inefficiency in manufacturing concerns.

The compositions may be analyzed by infra-red spectroscopy, measuring the maximum adsorption of chemical bonds associated with water, the nitrification inhibitor and/or the nitrogen stabilizer. For example, for NBPT the maximum absorption of the CO-bond may be monitored.

Kits

In other embodiment, the present invention provides a kit which includes a composition of the present invention and an testing device or indicator for confirming the physical properties of the composition. Non limiting examples of indicators include a crush strength indicator, a particle size indicator, or combinations thereof. Granular urea made by the present invention may have a crush strength of at least about 3 to about 3.1, to about 3.2, to about 3.3, to about 3.4 to about 3.5, about 3.6, to about 3.7, to about 3.8, to about 3.9, to about 4, to about 4.1, to about 4.2, to about 4.3, to about 4.4 to about 4.5, about 4.6, to about 4.7, to about 4.8, to about 4.9, to about 5 to about 3.1, to about 3.2, to about 3.3, to about 3.4 to about 3.5, about 3.6, to about 3.7, to about 3.8, to about 3.9, about 4 to about 4.1, to about 4.2, to about 4.3, to about 4.4 to about 4.5, about 4.6, to about 4.7, to about 4.8, to about 4.9, about 5 to about 5.1, to about 5.2, to about 5.3, to about 5.4 to about 5.5, about 5.6, to about 5.7, to about 5.8, to about 5.9, about 6 to about 6.1, to about 6.2, to about 6.3, to about 6.4 to about 6.5, about 6.6, to about 6.7, to about 6.8, to about 6.9, about 7 to about 7.1, to about 7.2, to about 7.3, to about 7.4 to about 7.5, about 7.6, to about 7.7, to about 7.8, to about 7.9, about 8 to about 8.1, to about 8.2, to about 8.3, to about 8.4 to about 8.5, about 8.6, to about 8.7, to about 8.8, to about 8.9, to about 9 lbs. Prilled urea according to the present invention may have a crush strength of about 0.8 to about 0.9, to about 1.0, to about 1.1, to about 1.2 pounds/in$^2$.

Granular and prilled urea made by the present invention may have a SGN of at least about 100, to about 120, to about 140, to about 160, to about 180, to about 200, to about 220, to about 240, to about 250, to about 260, to about 270, to about 275, to about 280, to about 285, to about 290, to about 295, to about 300, to about 305, to about 310, to about 315, to about 320, to about 325, to about 330, to about 335, to about 340, to about 345, to about 350, to about 355, to about 360, to about 365, to about 375, about 380, to about 390, to about 400.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Examples 1-82

Figure 3B:
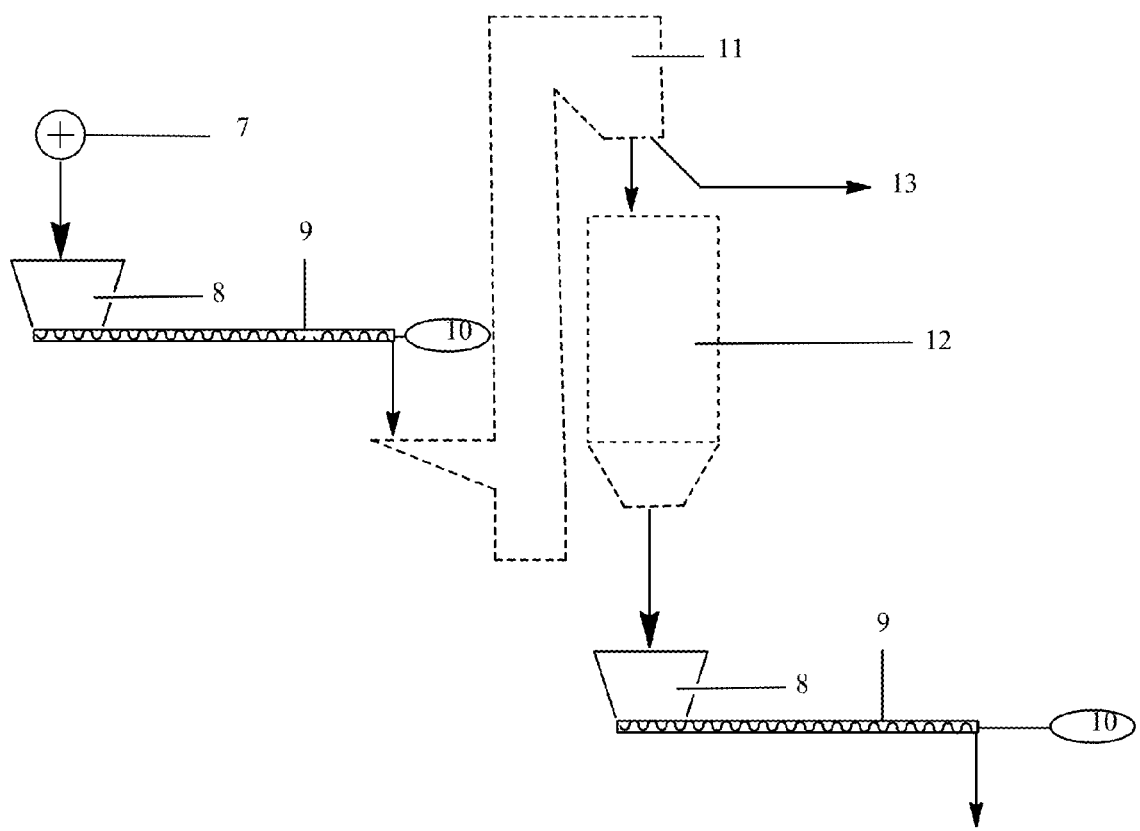
Figure 4:
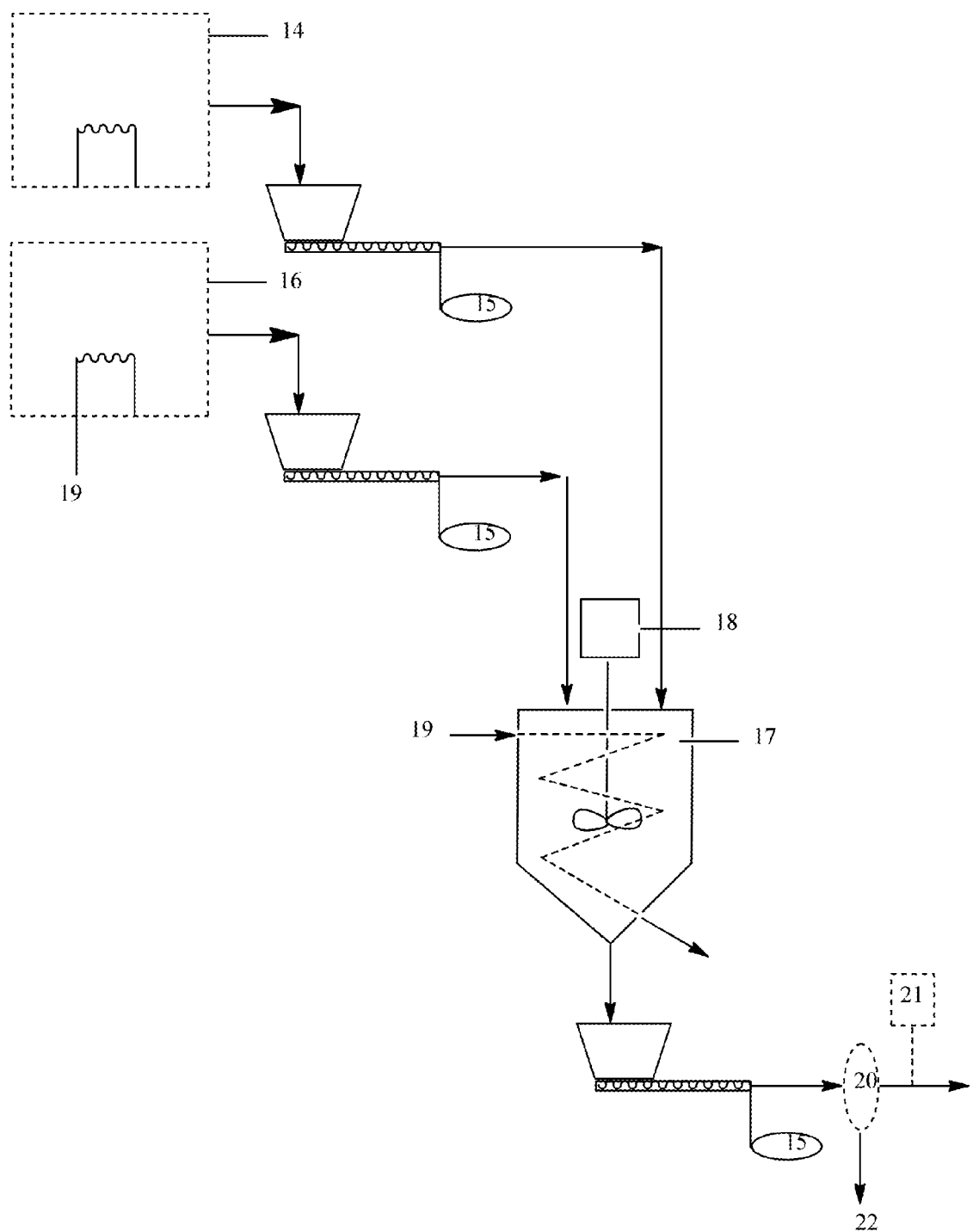
FIG. 4: Illustrates an example of a liquid component conveying system before being conveyed to the mixing tank.

For these examples, if DCD was added, a solid DCD composition in a supersack is transported to a solid nitrogen stabilizer unloader 1, where the sacks are discharged to a solid nitrogen stabilizer storage/conveying system as illustrated in FIGS. 3A and 3B. The solid DCD composition is pneumatically conveyed by 6 to solid nitrogen stabilizer composition storage unit 5. The solid nitrogen stabilizer composition storage unit 5 discharges the solid DCD composition through the solid nitrogen stabilizer composition storage airlock 7. The rate of discharge of the solid DCD is about 1.8 lb/hr, but this can vary depending on the desired composition. The solid nitrogen stabilizer composition storage and conveying system can be sized to fill solid nitrogen stabilizer composition storage unit in e.g. four (4) hours. Surge bins in solid nitrogen stabilizer composition system can be sized to provide e.g. thirty (30) minutes of surge/storage capacity.

The solid DCD composition is discharged into the solid nitrogen stabilizer composition crusher 3 where is milled to remove any clumps/aggregates. The solid nitrogen stabilizer composition crusher 3 is equipped with a grizzly to prevent any large, potentially damaging clumps from entering subsequent apparati. The crushed solid DCD composition is conveyed by the solid nitrogen stabilizer composition conveyor 9 to an elevator 11 which transfers the solid DCD composition up to the solid nitrogen stabilizer composition storage/surge bin 12. The solid nitrogen stabilizer composition storage/surge bin 12 provides about four (4) hour storage capacity of the solid nitrogen stabilizer composition at the rates described herein. The DCD composition is then metered by the solid nitrogen stabilizer composition conveyer 9 into the urea-nitrogen stabilizer composition mix tank at a rate of about 1.8 lb/hr or 816 kg/hr. The solid nitrogen stabilizer composition conveying system 9 pneumatically conveys the milled solid DCD composition to the urea-solid nitrogen stabilizer composition mix tank 25 at a temperature of about 80° F. or 27° C.

A slip stream of molten urea at about 280° F. or 138° C. is directed to the Mix Tank 25 after it has passed throughout the last evaporator to reduce it moisture content to about 1%. The molten urea is introduced at a rate of about 50,081 lb/hr or 22,764 kg/hr where it is mixed with the milled solid nitrogen stabilizer composition. The solid nitrogen stabilizer composition mix tank can be sized for a specific retention time e.g. a one (1) minute retention time. The urea-nitrogen stabilizer composition mix tank mixes the composition with an agitator for about one (1) minute to ensure adequate mixing while minimizing nitrogen stabilizer composition losses. The urea-solid nitrogen stabilizer composition mix tank discharges the urea-nitrogen stabilizer composition a granulation apparatus.

A 43% solution of 98% NBPT in NMP, liquid nitrogen stabilizer composition, is pumped from the liquid nitrogen stabilizer composition storage unit 14 via a pump 15 to the liquid nitrogen stabilizer composition 17 at a rate of about 418 lb/hr or 190 kg/hr at a temperature of about 80° F. or 27° C.

Dye is pumped from the additional component storage unit 16 via a pump 15 to the liquid nitrogen stabilizer composition mix tank 17 at a rate of about 14.8 or 6/7 kg/hr. The Liquid nitrogen stabilizer composition Nitrogen Stabilizer and Dye are mixed in the Liquid nitrogen stabilizer composition mix tank 17 and metered by the liquid nitrogen stabilizer composition pump after the liquid nitrogen stabilizer composition mix tank 15 through a filter 20 to remove any particulates. The NBPT/dye solution is introduced into the molten urea at a rate of 58 pounds per hour (1 pound of NBPT per 1172 pounds of urea) after the molten urea has passed through the last evaporator and the moisture content is about 1%. At the point where the crystalline NBPT is introduced, the molten urea stream had a temperature of about 275° F. (135° C.). The resulting stream of NBPT and molten urea is directed through a pipe leading directly to the granulation apparatus in the urea production facility. Although the retention time of the NBPT and molten urea stream between the point at which the crystalline NBPT is introduced and the urea granulation apparatus is less than about 20 seconds, the degree of turbulence in the stream of the molten urea composition assured thorough mixing of the crystalline NBPT and the molten urea.

The following are formulations according to the invention:

| Example | Urea | NBPT | DCD | Dye | NMP | HCHO from UF85 | $H_2O$ |
|---|---|---|---|---|---|---|---|
| 1 | Remainder | 0.2% | 0% | <3% | <1% | <0.5 | <0.2% |
| 2 | Remainder | 0.19% | 0% | <3% | <1% | <0.5 | <0.2% |
| 3 | Remainder | 0.18% | 0% | <3% | <1% | <0.5 | <0.2% |
| 4 | Remainder | 0.17% | 0% | <3% | <1% | <0.5 | <0.2% |
| 5 | Remainder | 0.16% | 0% | <3% | <1% | <0.5 | <0.2% |
| 6 | Remainder | 0.15% | 0% | <3% | <1% | <0.5 | <0.2% |
| 7 | Remainder | 0.14% | 0% | <3% | <1% | <0.5 | <0.2% |
| 8 | Remainder | 0.13% | 0% | <3% | <1% | <0.5 | <0.2% |
| 9 | Remainder | 0.12% | 0% | <3% | <1% | <0.5 | <0.2% |
| 10 | Remainder | 0.11% | 0% | <3% | <1% | <0.5 | <0.2% |
| 11 | Remainder | 0.1% | 0% | <3% | <1% | <0.5 | <0.2% |
| 12 | Remainder | 0.09% | 0% | <3% | <1% | <0.5 | <0.2% |
| 13 | Remainder | 0.08% | 0% | <3% | <1% | <0.5 | <0.2% |
| 14 | Remainder | 0.07% | 0% | <3% | <1% | <0.5 | <0.2% |
| 15 | Remainder | 0.06% | 0% | <3% | <1% | <0.5 | <0.2% |
| 16 | Remainder | 0.05% | 0% | <3% | <1% | <0.5 | <0.2% |
| 17 | Remainder | 0.04% | 0% | <3% | <1% | <0.5 | <0.2% |
| 18 | Remainder | 0.03% | 0% | <3% | <1% | <0.5 | <0.2% |
| 19 | Remainder | 0.02% | 0% | <3% | <1% | <0.5 | <0.2% |
| 20 | Remainder | 0.01% | 0% | <3% | <1% | <0.5 | <0.2% |
| 21 | Remainder | 0.2% | 0.5% | <3% | <1% | <0.5 | <0.2% |
| 22 | Remainder | 0.19% | 0.5% | <3% | <1% | <0.5 | <0.2% |
| 23 | Remainder | 0.18% | 0.5% | <3% | <1% | <0.5 | <0.2% |
| 24 | Remainder | 0.17% | 0.5% | <3% | <1% | <0.5 | <0.2% |
| 25 | Remainder | 0.16% | 0.5% | <3% | <1% | <0.5 | <0.2% |
| 26 | Remainder | 0.15% | 0.5% | <3% | <1% | <0.5 | <0.2% |
| 27 | Remainder | 0.14% | 0.5% | <3% | <1% | <0.5 | <0.2% |
| 28 | Remainder | 0.13% | 0.5% | <3% | <1% | <0.5 | <0.2% |
| 29 | Remainder | 0.12% | 0.5% | <3% | <1% | <0.5 | <0.2% |
| 30 | Remainder | 0.11% | 0.5% | <3% | <1% | <0.5 | <0.2% |
| 31 | Remainder | 0.1% | 0.5% | <3% | <1% | <0.5 | <0.2% |
| 32 | Remainder | 0.09% | 0.5% | <3% | <1% | <0.5 | <0.2% |
| 33 | Remainder | 0.08% | 0.5% | <3% | <1% | <0.5 | <0.2% |
| 34 | Remainder | 0.07% | 0.5% | <3% | <1% | <0.5 | <0.2% |
| 35 | Remainder | 0.06% | 0.5% | <3% | <1% | <0.5 | <0.2% |
| 36 | Remainder | 0.05% | 0.5% | <3% | <1% | <0.5 | <0.2% |
| 37 | Remainder | 0.04% | 0.5% | <3% | <1% | <0.5 | <0.2% |
| 38 | Remainder | 0.03% | 0.5% | <3% | <1% | <0.5 | <0.2% |
| 39 | Remainder | 0.02% | 0.5% | <3% | <1% | <0.5 | <0.2% |
| 40 | Remainder | 0.01% | 0.5% | <3% | <1% | <0.5 | <0.2% |
| 41 | Remainder | 0.2% | 1% | <3% | <1% | <0.5 | <0.2% |
| 42 | Remainder | 0.19% | 1% | <3% | <1% | <0.5 | <0.2% |
| 43 | Remainder | 0.18% | 1% | <3% | <1% | <0.5 | <0.2% |
| 44 | Remainder | 0.17% | 1% | <3% | <1% | <0.5 | <0.2% |
| 45 | Remainder | 0.16% | 1% | <3% | <1% | <0.5 | <0.2% |
| 46 | Remainder | 0.15% | 1% | <3% | <1% | <0.5 | <0.2% |
| 47 | Remainder | 0.14% | 1% | <3% | <1% | <0.5 | <0.2% |
| 48 | Remainder | 0.13% | 1% | <3% | <1% | <0.5 | <0.2% |
| 49 | Remainder | 0.12% | 1% | <3% | <1% | <0.5 | <0.2% |
| 50 | Remainder | 0.11% | 1% | <3% | <1% | <0.5 | <0.2% |
| 51 | Remainder | 0.1% | 1% | <3% | <1% | <0.5 | <0.2% |
| 52 | Remainder | 0.09% | 1% | <3% | <1% | <0.5 | <0.2% |
| 53 | Remainder | 0.08% | 1% | <3% | <1% | <0.5 | <0.2% |
| 54 | Remainder | 0.07% | 1% | <3% | <1% | <0.5 | <0.2% |
| 55 | Remainder | 0.06% | 1% | <3% | <1% | <0.5 | <0.2% |
| 56 | Remainder | 0.05% | 1% | <3% | <1% | <0.5 | <0.2% |
| 57 | Remainder | 0.04% | 1% | <3% | <1% | <0.5 | <0.2% |
| 58 | Remainder | 0.03% | 1% | <3% | <1% | <0.5 | <0.2% |
| 59 | Remainder | 0.02% | 1% | <3% | <1% | <0.5 | <0.2% |
| 60 | Remainder | 0.01% | 1% | <3% | <1% | <0.5 | <0.2% |
| 61 | Remainder | 0.2% | 0.5% | <3% | <1% | <0.5 | <0.2% |
| 62 | Remainder | 0.19% | 0.5% | <3% | <1% | <0.5 | <0.2% |
| 63 | Remainder | 0.18% | 0.5% | <3% | <1% | <0.5 | <0.2% |
| 64 | Remainder | 0.17% | 0.5% | <3% | <1% | <0.5 | <0.2% |
| 65 | Remainder | 0.16% | 0.5% | <3% | <1% | <0.5 | <0.2% |
| 66 | Remainder | 0.15% | 0.5% | <3% | <1% | <0.5 | <0.2% |
| 67 | Remainder | 0.14% | 0.5% | <3% | <1% | <0.5 | <0.2% |
| 68 | Remainder | 0.13% | 0.5% | <3% | <1% | <0.5 | <0.2% |
| 69 | Remainder | 0.12% | 0.5% | <3% | <1% | <0.5 | <0.2% |
| 70 | Remainder | 0.11% | 0.5% | <3% | <1% | <0.5 | <0.2% |
| 71 | Remainder | 0.1% | 0.5% | <3% | <1% | <0.5 | <0.2% |
| 72 | Remainder | 0.09% | 0.5% | <3% | <1% | <0.5 | <0.2% |
| 73 | Remainder | 0.08% | 0.5% | <3% | <1% | <0.5 | <0.2% |
| 74 | Remainder | 0.07% | 0.5% | <3% | <1% | <0.5 | <0.2% |
| 75 | Remainder | 0.06% | 0.5% | <3% | <1% | <0.5 | <0.2% |
| 76 | Remainder | 0.05% | 0.5% | <3% | <1% | <0.5 | <0.2% |
| 77 | Remainder | 0.04% | 0.5% | <3% | <1% | <0.5 | <0.2% |
| 78 | Remainder | 0.03% | 0.5% | <3% | <1% | <0.5 | <0.2% |
| 79 | Remainder | 0.02% | 0.5% | <3% | <1% | <0.5 | <0.2% |
| 80 | Remainder | 0.01% | 0.5% | <3% | <1% | <0.5 | <0.2% |

Comparative Example 82

This example illustrates a granular urea composition made by the same procedure as above, except the molten urea was made by remelting granular urea made using the same urea synthesis apparatus.

Comparative Example 83

This example illustrates a granular urea composition made by the same procedure as above, except NBPT with a purity of about 85% was introduced into the molten urea.

Example 84

This example illustrates a granular urea composition substantially free of solvent made by the same procedure as Examples 1-82 above, except solid NBPT is introduced into the molten urea by the same procedure as DCD.

Example 85

This example illustrates a granular urea composition made by the same procedure as Examples 1-82 above, except NBPT is introduced into the molten urea with a solvent other than NMP by the same procedure as DCD.

Example 85—Product Specifications—Biuret Content, Storage Stability and Ammonia Volatility The crush strength was determined by subjecting individual particles of urea to a measured force, applied by means of a metal plunger. The force, at which the particle fractures, was taken as a measure of strength. The average strength of 20 particles were reported.

The water, HCHO, NBPT and biuret content of the urea compositions were analyzed by IR and/or HPLC. All concentrations were calculated in μg/ml unless otherwise noted. HPLC samples were prepared by weighing approximately 0.4 grams of sample into a 10-20 mL disposable glass vial or volumetric flask. For high concentration samples (>30% inhibitor), approximately 0.025 grams of sample was weighed into a 100 mL volumetric flask. For lower concentration samples, 10 mL of water was added and the sample was shaken until the sample was dissolved. For higher concentration samples, the sample was diluted to the 100 mL mark with diluent. A disposable dropper was used to transfer the sample into an autosampler vial. The sample was analyzed in duplicate including a diluent blank using the conditions below. The evaluation was carried out by the method of external standard with the calibration using a calibration line. A minimum of 2 sets of standards as set out below were run before and after unknowns. RSD is the relative deviation in rel. %, calculated from three repeats of sampling and two repeats of analysis of each sample (see EP 15688). Standards were: Standard 1: 2 mL of stock NBPT solution (0.1 g of NBPT diluted with 100 mL water) further diluted with 10 mL water; Standard 2: 1 mL of stock NBPT solution (0.1 g of NBPT diluted with 100 mL water) further diluted with 10 mL water; Standard 3:0.1 mL of stock NBPT solution (0.1 g of NBPT diluted with 100 mL water) further diluted with 10 mL water. A gradient was set up with a mobile phase containing a first solvent A of HPLC grade water and a second solvent B of HPLC grade acetonitrile as shown below.

| Time (min) | Flow (mL/min) | % A | % B |
| --- | --- | --- | --- |
| Initial | 1.00 | 75 | 25 |
| 8 | 1.00 | 75 | 25 |

The chromatogram was evaluated at the wavelength of 214 nm. The mobile phase flow was 1 mL/min, the column temperature was 30° C. The injected volume was 15 μl. A Restek Ultra C18 5 μm 150×4.6 mm column. Units are presented as either % or ppm. The following formula was used to calculate the concentration of NBPT in the sample:

$$\frac{\left(\frac{\mu g}{mL} \text{ of } NBPT\right)(10 \text{ mL or } 100 \text{ mL})}{\text{sample weight in grams}} = \text{ppm of } NBPT \text{ in sample}$$

$$\text{E.g.: } \frac{\left(12 \frac{\mu g}{mL} \text{ of } NBPT\right)(10 \text{ mL})}{0.4000 \text{ g}} = 300 \text{ ppm of } NBPT \text{ in sample}$$

Table 1 shows product specifications for synthesized vs. remelted urea.

TABLE 1

| Product Specfications | | | |
| --- | --- | --- | --- |
| | Urea | Comparative Example 83 (average) | Examples 1-82 (average) |
| Crush Strength (lbs) | 7.5 | 5 | 7.6 |
| SGN | 277.0 | 245-255 | 267.4 |
| % HCHO | <0.5 | <0.5 | <0.5 |
| % Biuret | | 1.43-1.93 | 1.04-1.32 |
| % H$_2$O | | 0.2 | 0.04-0.2 |

A highly stable composition of urease inhibitor is a key feature of the compositions of the present invention. The compositions of the present invention were stored at various temperatures at daylight in glass, well-sealed containers. The stability results comparing compositions made with 85% pure NBPT or 98% pure NBPT and with or without DCD are shown below.

TABLE 2

| 22° C. Results | | | | | | |
| --- | --- | --- | --- | --- | --- | --- |
| Sample | Time (t) = 0 days (d) | t = 32 d | t = 56 d | t = 91 d | t = 6 months (m) | % NBPT Remaining after 6 months |
| NBPT (85% pure) Urea | 960 | 820 | 830 | 845 | 620 | 64.58% |
| NBPT (98% pure) Urea | 920 | 855 | 880 | 865 | 645 | 70.11% |
| NBPT (98% pure) Urea DCD | 950 | 885 | 890 | 740 | 825 | 86.84% |
| NBPT (85% pure) Urea DCD | 780 | 740 | 750 | 655 | 595 | 76.28% |

TABLE 3

| 45° C. Results | | | | | | |
| --- | --- | --- | --- | --- | --- | --- |
| Sample | t = 0, ppm | t = 32 | t = 56 | t = 91 | t = 6 m | % Remaining |
| NBPT (85% pure) Urea | 960 | 610 | 555 | 390 | 0 | .38% |
| NBPT (98% pure) Urea | 920 | 660 | 595 | 425 | 20 | 3.04% |
| NBPT (98% pure) Urea DCD | 850 | 790 | 725 | 620 | 375 | 9.47% |
| NBPT (85% pure) Urea DCD | 780 | 620 | 545 | 460 | 220 | 8.21% |

It has been found that the presence of impurities in the urease inhibitor in these compositions promotes the decomposition of the urease inhibitor into non-effective substances during a longer storage and is the main cause of urease inhibitor degradation during a long-term storage. As can be seen from the above tables, the purity of the urease inhibitor used has a stabilizing effect towards the final urease inhibitor composition. During storage over a 6 month period, the compositions using less pure NBPT showed a significant decrease in the content of the urease inhibitor independent of temperature (at 22° C. or 45° C.) than compositions prepared using purer form of NBPT. Surprisingly the compositions that contained a nitrification inhibitor, such as DCD, showed a stabilizing effect on the decomposition of NBPT independent of NBPT purity, although compositions that used less pure NBPT showed a greater decrease in the content of the urease inhibitor than compositions prepared using purer form of NB PT, independent of the storage temperature (at 22° C. or 45° C.).

Figure 7A:
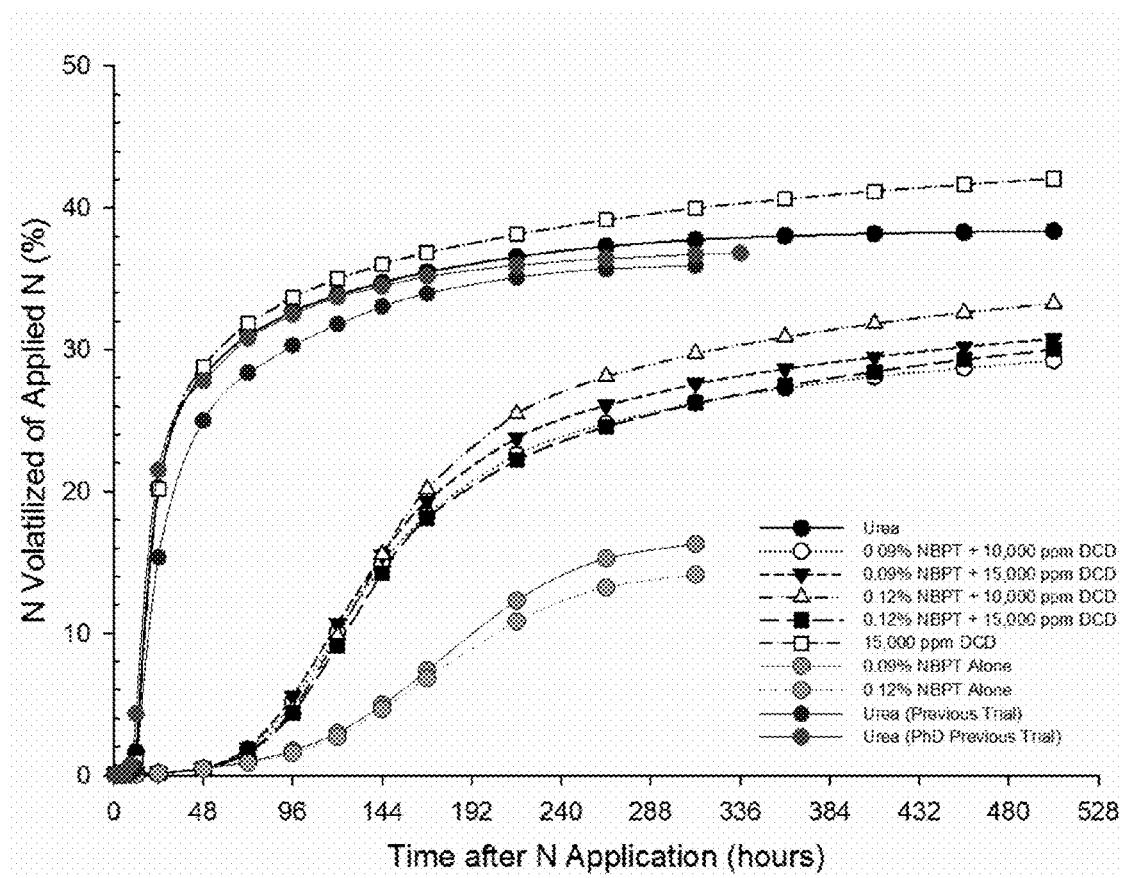
FIG. 7A-C: Illustrates the cumulative N loss (percentage of applied) as $NH_2$ from granular urea treated with the urease inhibitor N-(n-butyl)thiophosphoric triamide (NBPT) and optionally DCD in different soils.
Figure 7B:
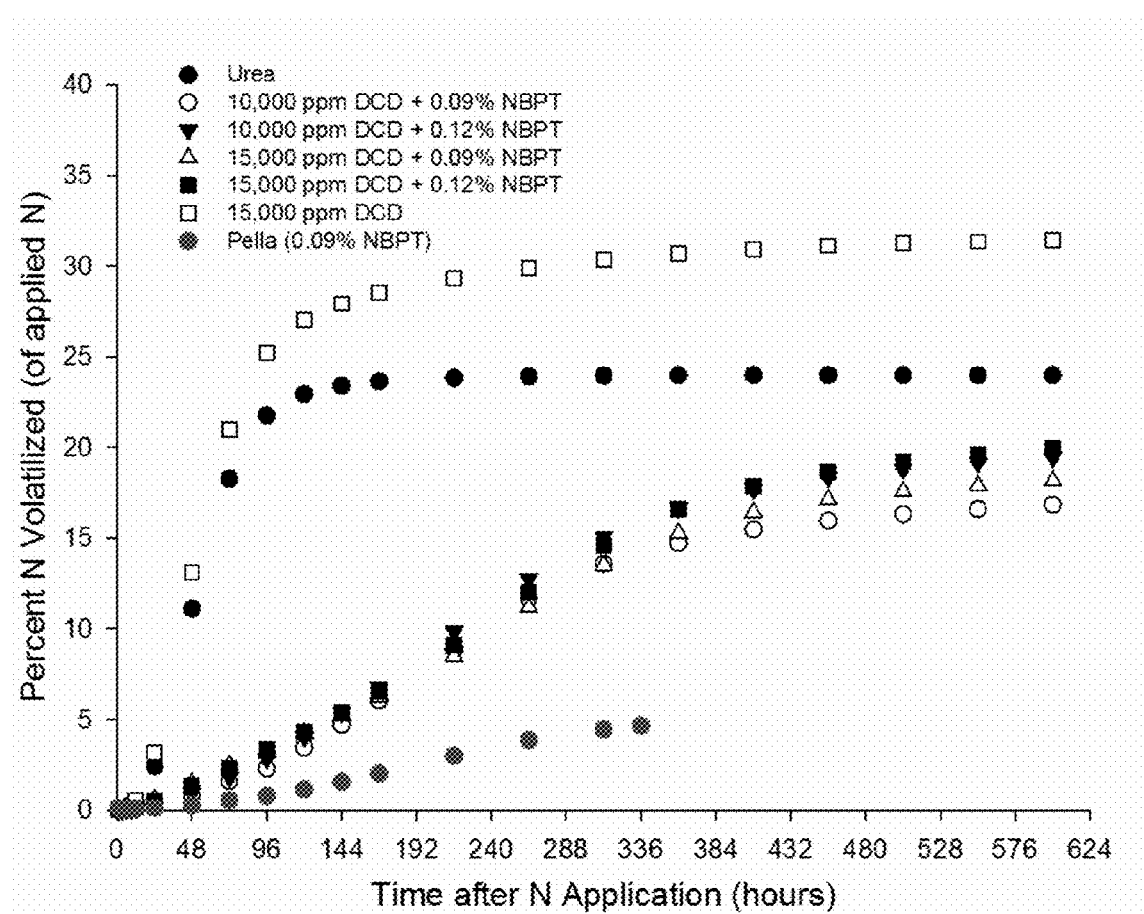
Figure 7C:
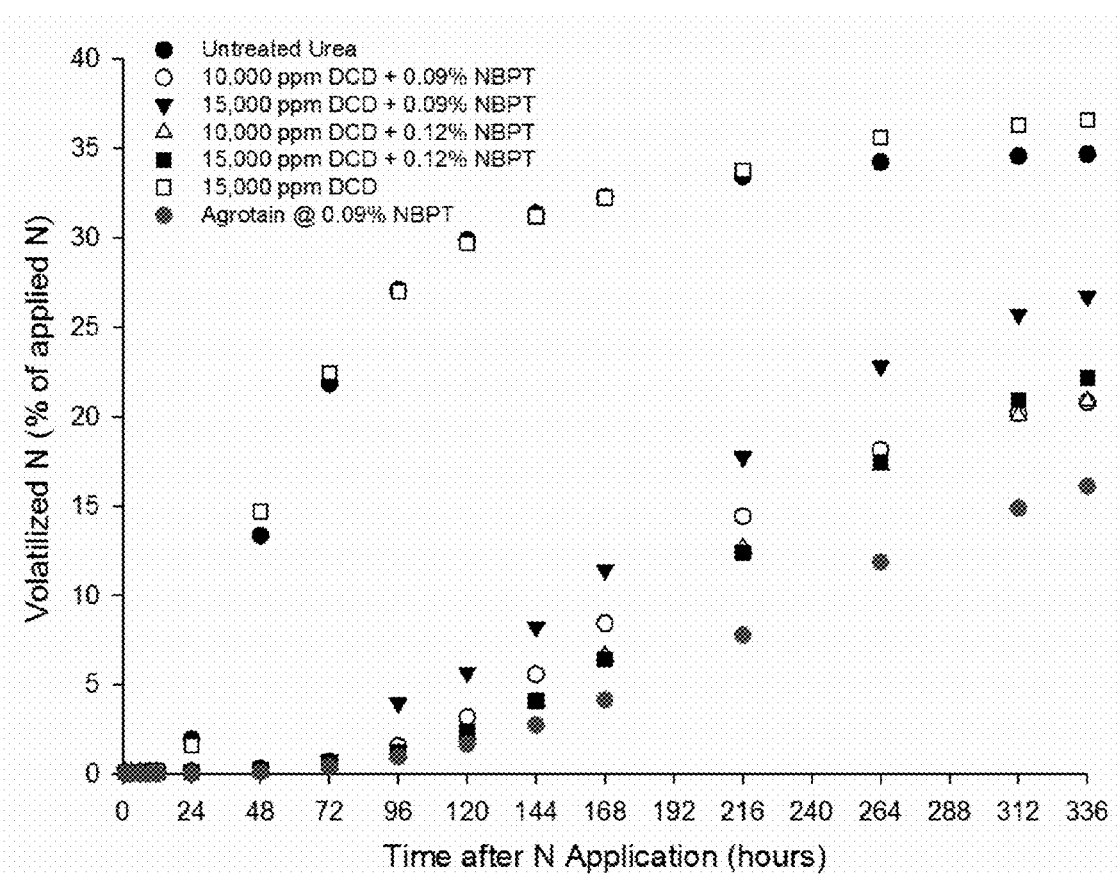

In addition, ammonia volatility studies were performed in accordance with Woodward et al. Agronomy Journal 103(1): 38-44 (2011) and Frame et al. Agronomy Journal 104(5): 1201-1207 (2012). Results are shown in FIGS. 7A-C. These studies surprisingly show that there is a significant reduction in ammonia volatilization when the nitrification inhibitor is not incorporated into the urea compositions of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Similarly, as will be apparent to one skilled in the art, various modifications can be made within the scope of the aforesaid description. Such modifications being within the ability of one skilled in the art form a part of the present invention and are embraced by the appended claims.

What we claim is:

1. A stabilized urea composition comprising:
   a. urea; and
   b. a nitrogen stabilizer composition, wherein said nitrogen stabilizer composition comprises NBPT at a purity of at least 90%, and further wherein the concentration of NBPT is less than 0.2 weight percent based on the total weight of the stabilized urea composition.

2. The composition of claim 1, wherein said nitrogen stabilizer composition further comprises a nitrification inhibitor.

3. The composition of claim 2, wherein said nitrification inhibitor is selected from the group consisting of thiourea, 1-mercapto-1,2,4-triazole, 2-amino-4-chloro-6-methyl-pyramidine, 2,4-diamino-6-trichloro-methyltriazine, 2-chloro-6-(trichloromethyl-pyridine), 3,4-dimethylpyrazole phosphate (DMPP), 1H-1,2,4-triazole, 4-amino-1,2,4-triazole, 3-methylpyrazole, azadirachta indica Juss (Neem) and nitrapyrin.

4. The composition of claim 2 wherein said nitrification inhibitor is dicyandiamide (DCD).

5. The composition of claim 1, wherein said stabilized urea composition is in liquid form.

6. The composition of claim 1, wherein said stabilized urea composition is in solid form.

7. The composition of claim 5, wherein said liquid urea is selected from the group consisting of molten urea and urea ammonium nitrate (UAN).

8. The composition of claim 7, wherein said urea is molten urea and further wherein said nitrogen stabilizer comprises dicyandiamide (DCD).

9. The composition of claim 7 wherein said urea is urea ammonium nitrate (UAN) and further wherein said nitrogen stabilizer comprises dicyandiamide (DCD).

10. The composition of claim 6, wherein a portion of said nitrogen stabilizer composition is present on the surface of said solid urea and further wherein said urea is a solid prill, granule, pellet, or pastille.

11. The composition of claim 1 further comprising monoammonium phosphate (MAP) or diammonium phosphate (DAP).

12. The composition of claim 1, wherein the NBPT has a purity of at least 95%.

13. The composition of claim 1, wherein the NBPT has a purity from 95% to about 98%.

14. The composition of claim 13, wherein the nitrogen stabilizer further comprises DCD.

15. The composition of claim 1, wherein the concentration of NBPT is between 0.001 wt. % and 0.2 wt. % based on the total weight of the stabilized urea composition.

16. The composition of claim 1, wherein the nitrogen stabilizer composition further comprises a carrier.

17. The composition of claim 16, wherein the carrier is selected from the group consisting of alkanol, alkenol, hydroxyalkyl aryl, glycol, glycol ether, glycol ester, glycerol, poly(alkylene glycol), poly(alkylene glycol) ether, poly(alkylene glycol) ester, alkanolamine, hydroxy acid, DMSO, N-methyl 2-pyrrolidinone (NMP), and mixtures thereof.

18. The composition of claim 17, wherein the glycol is propylene glycol.

19. The composition of claim 17, wherein the carrier is a mixture of propylene glycol and NMP.

20. The composition of claim 17, wherein the alkanolamine is selected from the group consisting of ethanolamine, diethanolamine, and triethanolamine.

21. A composition comprising:
   a. a nitrogen stabilizer composition comprising NBPT at a purity of at least 90%, and
   b. a liquid carrier selected from the group consisting of alkanol, alkenol, hydroxyalkyl aryl, glycol, glycol ether, glycol ester, glycerol, poly(alkylene glycol), poly(alkylene glycol) ether, poly(alkylene glycol) ester, alkanolamine, hydroxy acid, DMSO, N-methyl 2-pyrrolidinone (NMP), and mixtures thereof, wherein the concentration of NBPT in the liquid carrier is between 1 wt. % and 55 wt. %.

22. The composition of claim 21, wherein the glycol is propylene glycol.

23. The composition of claim 21, wherein the liquid carrier is a mixture of propylene glycol and NMP.

24. The composition of claim 21, wherein the nitrogen stabilizer composition further comprises dicyandiamide (DCD).

25. The composition of claim 21, wherein the NBPT has a purity of at least 95%.

26. A method of making a stabilized urea composition comprising:
   a. providing a liquid nitrogen stabilizer composition comprising a liquid carrier and a nitrogen stabilizer composition, wherein said nitrogen stabilizer composition comprises NBPT at a purity of at least 90%, and further wherein the concentration of NBPT in the liquid carrier is between 1 wt. % and 55 wt. %, and
   b. contacting said liquid nitrogen stabilizer composition with solid urea.

27. The method of claim 26, wherein the NBPT has a purity of about 95%.

28. The method of claim 26, wherein said solid urea is a prill, granule, pellet, or pastille.

* * * * *